United States Patent
Zhang et al.

(10) Patent No.: US 9,276,883 B2
(45) Date of Patent: Mar. 1, 2016

(54) INFORMATION COLLECTION, STORAGE, AND SHARING PLATFORM

(71) Applicant: TENCENT TECHNOLOGY (SHENZHEN) COMPANY LIMITED, Shenzhen, Guangdong (CN)

(72) Inventors: Bin Zhang, Shenzhen (CN); Kai Li, Shenzhen (CN); Xueqin Lin, Shenzhen (CN); Zhiyuan Lin, Shenzhen (CN); Jiangxun Lin, Shenzhen (CN); Zhuo Tang, Shenzhen (CN); Ling Li, Shenzhen (CN); Yi Dan, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 13/989,730

(22) PCT Filed: Apr. 28, 2013

(86) PCT No.: PCT/CN2013/075008
§ 371 (c)(1),
(2) Date: May 24, 2013

(87) PCT Pub. No.: WO2014/176744
PCT Pub. Date: Nov. 6, 2014

(65) Prior Publication Data
US 2014/0324986 A1  Oct. 30, 2014

(51) Int. Cl.
*G06F 15/16* (2006.01)
*H04L 12/58* (2006.01)

(52) U.S. Cl.
CPC ................................. *H04L 51/046* (2013.01)

(58) Field of Classification Search
USPC ................................................. 709/206, 207
See application file for complete search history.

(56) References Cited

U.S. PATENT DOCUMENTS

| 2003/0182327 | A1* | 9/2003 | Ramanujam | G06F 17/30578 |
| 2005/0044165 | A1* | 2/2005 | O'Farrell | G06Q 10/10 709/213 |
| 2011/0151837 | A1* | 6/2011 | Winbush, III | H04W 8/22 455/412.1 |

(Continued)

FOREIGN PATENT DOCUMENTS

| CN | 101056320 A | 10/2007 |
| CN | 101815087 A | 8/2010 |

(Continued)

OTHER PUBLICATIONS

Tencent Technology, ISR, PCT/CN2013/075008, Feb. 20, 2014, 4 pgs.

*Primary Examiner* — Vivek Srivastava
*Assistant Examiner* — Hermon Asres
(74) *Attorney, Agent, or Firm* — Morgan, Lewis & Bockius LLP

(57) ABSTRACT

A mobile terminal collects information items identified by a user of the mobile terminal, the collected information items having different formats of data that are to be rendered by different applications at the mobile terminal. The mobile terminal synchronizes itself with the remote server so that the user can access the plurality of information items stored at the remote server from another terminal. Next, the mobile terminal displays some information items in a chronological order. In response to detecting a user selection of one information item, the mobile terminal determines whether data associated with the information item is in the mobile terminal or not. If the data is present in the mobile terminal, the mobile terminal then renders the data on the mobile terminal. Otherwise, the mobile terminal first downloads the data from the remote server and then renders the data on the mobile terminal.

16 Claims, 18 Drawing Sheets

(56) References Cited

U.S. PATENT DOCUMENTS

2013/0325954 A1* 12/2013 Cupala .................. G06F 3/041
709/204

FOREIGN PATENT DOCUMENTS

| CN | 102754352 A | 10/2012 |
|----|-------------|---------|
| CN | 103064637 A | 4/2013  |

* cited by examiner

INFORMATION COLLECTION, STORAGE, AND SHARING PLATFORM

CROSS REFERENCE TO RELATED APPLICATION

This Application is a United States National Stage Application filed under 35 U.S.C. §371 of PCT Patent Application Serial No. PCT/CN2013/075008 filed on Apr. 28, 2013, the contents of which are hereby incorporated in their entirety.

TECHNICAL FIELD

The disclosed implementations relate generally to an Internet-based electronic messaging service system, and in particular, to an information collection, storage, and sharing platform based on the electronic messaging service system.

BACKGROUND

More and more people use their mobile terminals (e.g., smartphones) to access information such as reading news, listening to songs, watching videos, etc., and exchange information with others such as texting, sending/receiving emails, etc. But there is no application or service on a smartphone that allows a user to easily revisit all different types of information that s/he has accessed before. For example, if a user wants to listen to a favorite song again, s/he has to start a music player to find and replay the song. If the user wants to re-read a web page on a website, s/he has to restart a web browser and enter the address (e.g., URL) of the web page through the web browser. In other words, the user cannot easily store and manage different types of information that s/he may revisit through a single, universal user interface.

SUMMARY

In accordance with some implementations described below, a method for managing information items is performed at a mobile terminal having memory and one or more processors that is communicatively coupled to a remote server. The mobile terminal collects a plurality of information items identified by a user of the mobile terminal, the collected information items having different formats of data that are to be rendered by different applications at the mobile terminal. The mobile terminal synchronizes itself with the remote server so that the user can access the plurality of information items stored at the remote server from another terminal. Next, the mobile terminal displays at least a subset of the plurality of information items in a chronological order on its display. In response to detecting a user selection of one of the displayed information items, the mobile terminal determines whether data associated with the user-selected information item is in the mobile terminal or not. If the data associated with the user-selected information item is in the mobile terminal, the mobile terminal then renders the data on the mobile terminal by, e.g., invoking an application designed for the data. Otherwise, the mobile terminal downloads the data from the remote server and then renders the data on the mobile terminal using the application.

In accordance with some implementations described below, a mobile terminal for managing information items is provided. The mobile terminal includes one or more processors and memory for storing one or more programs. The programs, when executed by the one or more processors, cause the mobile terminal to perform the following operations: collecting a plurality of information items identified by a user of the mobile terminal, wherein the plurality of information items have different formats of data that are to be rendered by different applications at the mobile terminal; synchronizing the mobile terminal with the remote server so that the user can access the plurality of information items stored at the remote server from another terminal; displaying at least a subset of the plurality of information items in a chronological order; in response to detecting a user selection of one of the displayed information items, determining whether data associated with the user-selected information item is in the mobile terminal or not; if the data associated with the user-selected information item is in the mobile terminal, rendering the data on the mobile terminal; and if the data associated with the user-selected information item is not currently in the mobile terminal, downloading the data from the remote server and then rendering the data on the mobile terminal.

In accordance with some implementations described below, a method for storing data associated with an information item identified by a mobile terminal is performed at a server having memory and one or more processors. The server receives a request to upload an information item from the mobile terminal, the request including an identifier of the information item and determines whether there is an existing copy of the information item stored at the server. If there is an existing copy of the information item stored at the server, the server identifies an address of the existing copy of the information item at the server and returns a response to the mobile terminal, the response including the an address of the existing copy of the information item at the server, so that the mobile terminal associates the information item at the mobile terminal with the address and provides an update indicating that the information item has been updated to the server. If there is no existing copy of the information item stored at the server, the server returns a negative response to the mobile terminal, so that the mobile terminal decides whether or not to upload the information item based at least in part on a size of the information item.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
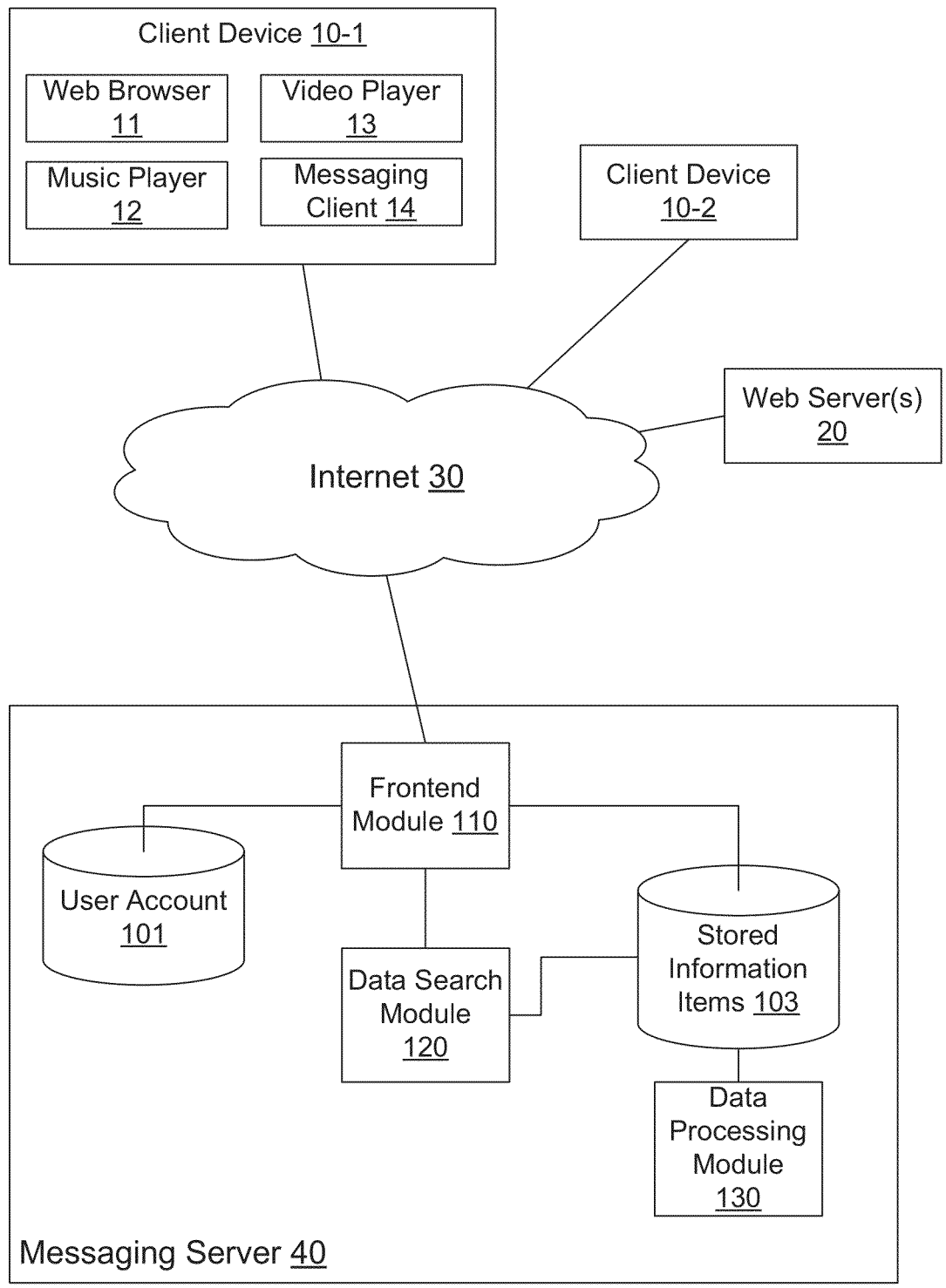
FIG. 1 is a block diagram illustrating a distributed network environment including client devices, web servers, Internet, and an electronic messaging server for storing information items collected by users of the client devices and returning/forwarding information items to the client devices in accordance with some implementations.

FIG. 1 is a block diagram illustrating a distributed network environment including multiple client devices 10 (10-1, 10-2), web servers 20, the Internet 30, and an electronic messaging server 40 for storing information items collected by users of the client devices and returning/forwarding information items to the client devices in accordance with some implementations. Depending on the context, a client device in the present application may be a desktop, a laptop, or a mobile terminal such as a smartphone or a tablet computer, etc. For illustrative purposes, the term "client device" used below usually refers to a mobile terminal unless otherwise specified. As shown in FIG. 1, the client device 10-1 includes different applications providing different services to a user of the client device 10-1. For example, the user uses the web browser 11 to access information hosted by different web servers 20. Similarly, the user uses the music player 12 to listen to a song, the video player 13 to watch a movie, the messaging client 14 to exchange text, audio, video messages with others, etc.

Although the versatility of a smartphone-type client device makes it a good choice for managing different types of information accessed by a user for future use, the storage and processing capacity of an individual client device can barely meet all the needs from a user of the client device. As shown in FIG. 1, the client devices 10-1 and 10-2 are communicatively coupled to a messaging server 40, which supports the client devices to manage the information accessed by users of the client devices. For convenience, FIG. 1 does not necessarily include all the components used for supporting the messaging server 40 to provide messaging services. Rather, FIG. 1 focuses on those components used for managing information items accessed by different users of the messaging server 40. For example, the messaging server 40 includes a frontend module 110 for receiving information items uploaded into the messaging server 40 by users of respective client devices and pushing information items requested by users of different client devices. The user account database 101 stores identifiers of different user accounts of the messaging server 40 such that each information item uploaded into the messaging server 40 is associated with a user account. Note that it is possible that the same information item (e.g., a song) may be associated with multiple user accounts if this one has been collected by multiple users. Information items collected by different users as well as associated metadata used for managing the information items (e.g., the author of an information item, the publication and collection timestamp of the information item, the type, subject, and synopsis of the information item, etc.) are saved in the stored information item database 103. Exemplary information items include an image, a web page, a URL, a text message, a text document, an audio stream, a video stream, a geographical location, etc.

As will be described below, a user of a mobile terminal collects information items from different sources, local or remote, and has them stored in the messaging server by performing a predefined operation (e.g., a finger tap) on the information items. Note that the term "source" in the present application refers to an origin of an information item collected by the user, which may be a remote web server that hosts a web page that the user likes to collect or a music player application running on the mobile terminal that plays a song the user wants to collect. One purpose of storing the information items at the messaging server 40 is to make them available to a user if s/he wants to revisit one of them sometime in the future. To support this feature, the messaging server 40 includes a data search module 120 for searching the stored information item database 103 for information item(s) that satisfies the search terms provided by a user of the messaging server 40 from a mobile terminal. In some implementations, the messaging server 40 further includes a data processing module 130 for processing some information items uploaded into the stored information item database 103. For example, the data processing module 130 can recognize texts in an image or convert an audio stream into a text file. In either case, a non text-based information item (e.g., an image or an audio stream) can be indexed by the texts identified in the information item so that the information item may be returned to a user if it satisfies the user-provided search terms. As will be described below, there is a many-to-many mapping relationship (of which, a one-to-one mapping relationship is a special case) between a user account in the user account database 101 and an information item in the stored information item database 103. In some implementations, in response to a user's request for information items collected by the user from a mobile terminal, the messaging server 40 identifies the information items associated with the user based on a mapping relationship between the user's user account and the information items and returns them to the requesting user at the mobile terminal.

Figure 2:
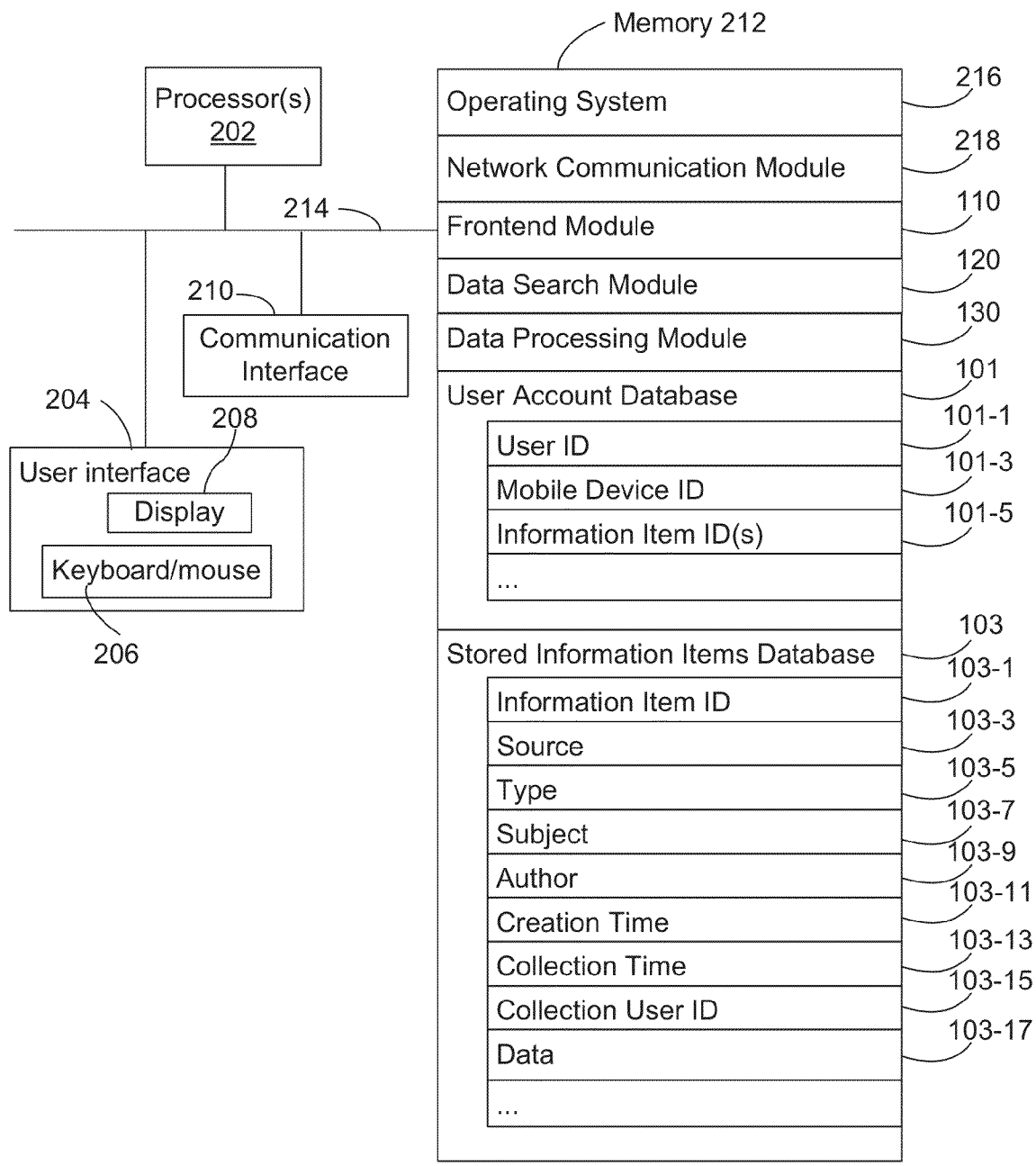
FIG. 2 is a block diagram illustrating different components of the electronic messaging server in accordance with some implementations.

FIG. 2 is a block diagram illustrating different components of the electronic messaging server 40 in accordance with some implementations. The messaging server 40 includes memory 212; one or more processors 202 for executing modules, programs and/or instructions stored in the memory 212 and thereby performing predefined operations; one or more network or other communications interfaces 210; and one or more communication buses 214 for interconnecting these components. In some implementations, the messaging server 40 includes a user interface 204 comprising a display device 208 and one or more input devices 206 (e.g., keyboard or mouse). In some implementations, the memory 212 includes high-speed random access memory, such as DRAM, SRAM, or other random access solid state memory devices. In some implementations, memory 212 includes non-volatile memory, such as one or more magnetic disk storage devices, optical disk storage devices, flash memory devices, or other non-volatile solid state storage devices. In some implementations, memory 212 includes one or more storage devices remotely located from the processor(s) 202. Memory 212, or alternately one or more storage devices (e.g., one or more nonvolatile storage devices) within memory 212, includes a non-transitory computer readable storage medium. In some implementations, memory 212 or the computer readable storage medium of memory 212 stores the following programs, modules and data structures, or a subset thereof:
- an operating system 216 that includes procedures for handling various basic system services and for performing hardware dependent tasks;
- a network communications module 218 that is used for connecting the messaging server 40 to other computers (e.g., the client devices 10 and the web servers 20 in FIG. 1) via the communication network interfaces 210 and one or more communication networks (wired or wireless), such as the Internet 30 in FIG. 1, other wide area networks, local area networks, metropolitan area networks, etc.;

a frontend module 110 for receiving a request or query from a client device 10 for receiving information items uploaded into the messaging server 40 by users of respective client devices 10 and pushing information items requested by users of different client devices 10;

a data search module 120 for searching the stored information item database 103 for information item(s) that satisfies search terms provided by a user of the messaging server 40 from a client device 10;

a data processing module 130 for processing some information items uploaded into the stored information item database 103, e.g., extracting texts from an image or an audio stream, and using such texts for indexing the information items;

a user account database 101 including a plurality of user entries of the messaging server 40, each user entry including a user identifier 101-1 that uniquely identifies a user of the messaging server 40, a mobile device identifier 101-3 (e.g., a phone number, a MAC address or IMEI number, etc.) that identifies a mobile terminal (e.g., a smartphone) used by the user for collecting information items and having them uploaded into the messaging server 40, and one or more information item identifiers 101-5, each uniquely identifying an information item collected by the user and saved in the stored information item database 103; and a stored information item database 103 including a plurality of information item entries, each information item entry including an information item identifier 103-1 that uniquely identifies an information item in the database 103, a source 103-3 (e.g., a URL of a web page) of the information item, a type 103-5 (e.g., image, audio, video, etc.) of the information item, a subject 103-7 of the information item (which may be something provided by a user when collecting the information item), an author 103-9 (e.g., the person who generates a text, video, audio message) of the information item, a creation time 103-11 of the information item, a collection time 103-13 of the information item, a collection user identifier 103-15 that uniquely identifies a user who first has the information item uploaded into the messaging server 40, and data 103-17 associated with the information item (e.g., text, video, or audio data).

It should be noted that the modules, databases, and models in the messaging server 40 describe above in connection with FIG. 2 may be implemented on a single computer server or distributed among multiple computer servers that are connected by a computer network. Although a specific hardware configuration may affect the performance of the messaging server 40, the implementation of the present application is not dependent on a particular hardware configuration.

Figure 3:
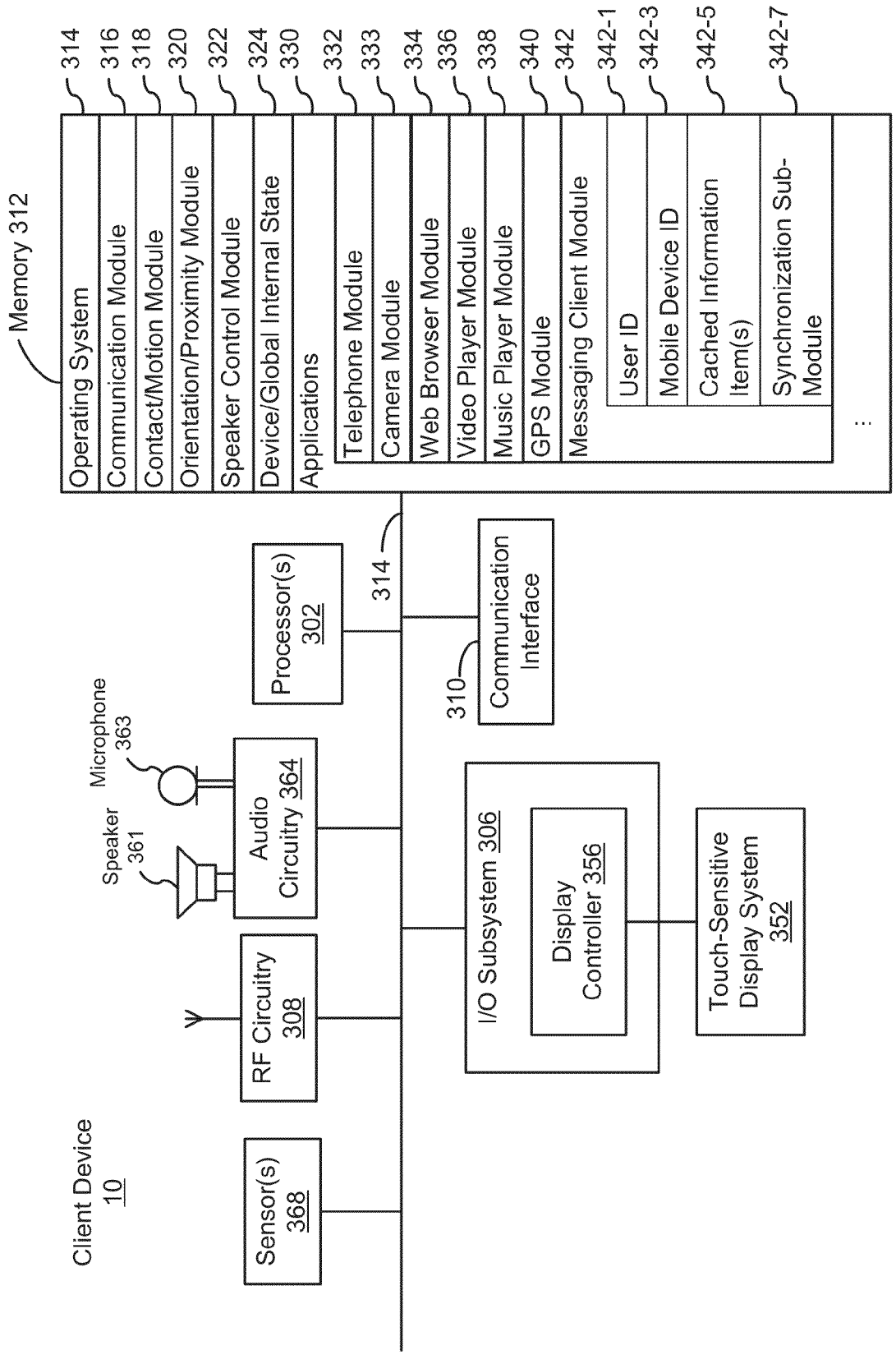
FIG. 3 is a block diagram illustrating different components of a client device (e.g., a smartphone) in accordance with some implementations.

FIG. 3 is a block diagram illustrating different components of a client device 10 with an optional touch-sensitive display system 352 (e.g., a smartphone) in accordance with some implementations. The client device 10 may include memory 312 (which may include one or more computer readable storage mediums), one or more processors 302, audio circuitry 364, speaker 361, microphone 363, input/output (I/O) subsystem 306, RF (radio frequency) circuitry 308, and one or more sensors 368. These components may communicate over one or more communication buses 314.

Memory 312 may include high-speed random access memory and may also include non-volatile memory, such as one or more magnetic disk storage devices, flash memory devices, or other non-volatile solid-state memory devices. The processors 302 run or execute various software programs and/or sets of instructions stored in the memory 312 to perform various functions for the client device 10 and to process data.

RF circuitry 308 converts electrical signals to/from electromagnetic signals and communicates with communications networks and other communications devices via the electromagnetic signals. RF circuitry 308 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 308 may communicate with networks, such as the Internet, an intranet and/or a wireless network, such as a cellular telephone network, a wireless local area network (WLAN) and/or a metropolitan area network (MAN), and other devices by wireless communication.

Audio circuitry 364, speaker 361, and microphone 363 provide an audio interface between a user and the client device 10. Audio circuitry 364 receives audio data from the communication buses 314, converts the audio data to an electrical signal, and transmits the electrical signal to speaker 361. Speaker 361 converts the electrical signal to human-audible sound waves. Audio circuitry 364 also receives electrical signals converted by microphone 363 from sound waves. Audio circuitry 364 converts the electrical signal to audio data and transmits the audio data to the processors 302 for processing.

I/O subsystem 306 may include a display controller 356 for controlling the touch-sensitive display 352 to implement, e.g., virtual or soft buttons and one or more soft keyboards. The touch-sensitive display 352 provides an input interface and an output interface between the device and a user. Display controller 356 receives and/or sends electrical signals from/to the touch-sensitive display 352. The touch-sensitive display 352 displays visual output to the user. The visual output may include graphics, text, icons, video, and any combination thereof (collectively termed "graphics"). In some implementations, some or all of the visual output may correspond to user-interface objects.

The touch-sensitive display 352 has a touch-sensitive surface, sensor or set of sensors that accepts input from the user based on haptic and/or tactile contact. The touch-sensitive display 352 and the display controller 356 (along with any associated modules and/or sets of instructions in memory 302) detect contact (and any movement or breaking of the contact) on the touch-sensitive surface and converts the detected contact into interaction with user-interface objects (e.g., one or more soft keys, icons, web pages or images) that are displayed on the touch-sensitive display 352.

The sensors 368 in the client device 10 may include one or more proximity sensors for turning off and disabling the touch-sensitive display 352 when the client device 10 is placed near the user's ear (e.g., when the user is making a phone call). The client device 10 may also include one or more accelerometers for detecting the movement of the client device 10, a magnetometer for determining the orientation of the client device 10, a GPS receiver for obtaining the geographical location information of the client device 10, and one or more image sensors for capturing still images or video streams.

As shown in FIG. 3, the program components stored in the memory 312 include operating system 314, communication module (or set of instructions) 316, contact/motion module (or set of instructions) 318, orientation/proximity module (or set of instructions) 320, speaker control module (or set of instructions) 322, and device/global internal state 324 including one or more of: active application state, indicating which applications, if any, are currently active; display state, indicating what applications, views or other information occupy various regions of the touch-sensitive display 352; and sensor state, including information obtained from the mobile terminal's various sensors 368.

Operating system 314 further includes various software components and/or drivers for controlling and managing general system tasks (e.g., memory management, storage device control, power management, etc.) and facilitates communication between various hardware and software components. Communication module 316 facilitates communication with other devices over the communication buses 314 and also includes various software components for handling data received by RF circuitry 308. Contact/motion module 318 may detect contact with the touch-sensitive display 352 (in conjunction with the display controller 356) and motions by the contact. Contact/motion module 318 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Orientation/proximity module 320 determines the orientation of the mobile terminal and its proximity to other objects (e.g., the user's ear or finger) and provides this information for use in various applications (e.g., to telephone module 332). The speaker control module 322 controls the operation of the speaker 361 in accordance with the output signals from different sensors 368.

Applications 330 stored in the memory 312 may include the following modules (or sets of instructions), or a subset or superset thereof: telephone module 332, camera module 333, web browser module 334, video player module 336, music player module 338, GPS module 340, and messaging client module 342. In some implementations, the messaging client module 342 provides an application programming interface (API) for other applications to interact with the messaging client module 342 in conjunction with collecting different information items identified by the user of the client device 10 using the messaging client module 342 and having them uploaded into the messaging server 40. For example, the messaging client module 342 may include: an identifier 342-1 of the user of the client device 10, which is used to associate the information items with the user as described above in connection with FIG. 2; a mobile device identifier 342-3 for binding the client device 10 to the user's account at the messaging server 40; one or more cached information items 342-5, which may be downloaded onto the client device 10 from a web server 20 or the messaging server 40; and a synchronization module 342-7 for synchronizing the client device 10 with the messaging server 40 according to a predefined schedule.

As will be described below, a user of the client device 10 (e.g., a smartphone) invokes the messaging client module 342 for not only exchanging messages with another user but also collecting those information items of potential interest to the user into the messaging server 40 for future revisit. The information item collection process may happen at many different applications running on the smartphone. For example, the user may mark a web page visited by the user through the web browser module 334 as being collected. In response, the messaging client module 342 identifies either the URL of the web page or the content of the web page or both and has them uploaded into the messaging server 40. The user may choose to collect a favorite video stream using the messaging client module 342. At least in part depending on the size of the collected information item, the messaging client module 342 chooses an appropriate network interface for uploading the information item to, e.g., reduce the usage of cellular wireless communication network (which is not only slow compared with other types of wireless network (e.g., Wi-Fi) but may also incur additional charge by the carrier).

Figure 4A:
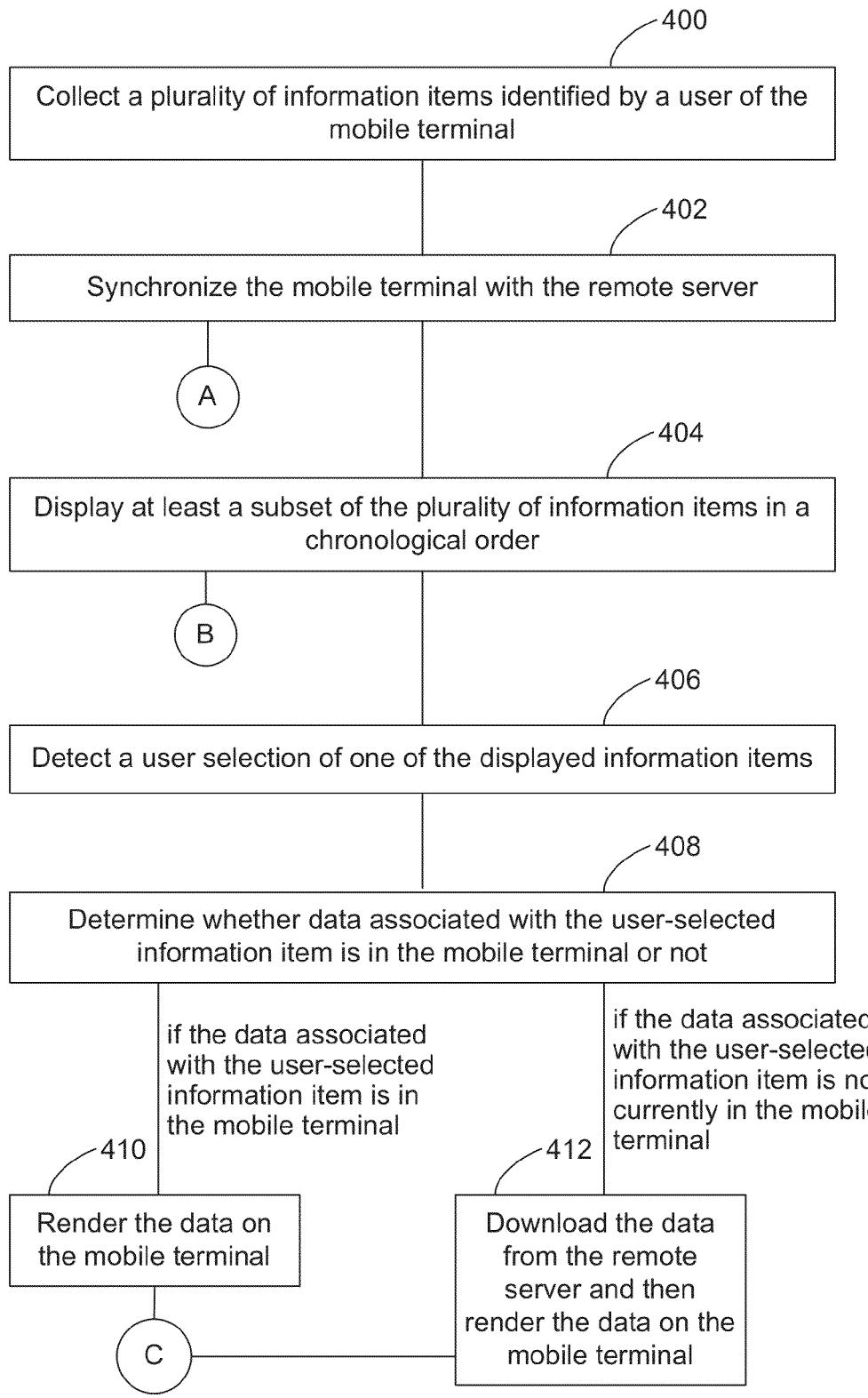
FIGS. 4A-4D are flow charts illustrating how a mobile terminal collects information items identified by a user, synchronizes them with the messaging server, and invokes applications to provide services relating to these information items in accordance with some implementations.

FIGS. 4A-4D are flow charts illustrating how a mobile terminal (e.g., a smartphone) collects information items identified by a user, synchronizes them with the messaging server, and invokes applications to provide services relating to these information items in accordance with some implementations. As shown in FIG. 4A, the mobile terminal collects (400) a plurality of information items identified by a user of the mobile terminal. In some implementations, an information item is collected from a respective source in response to a predefined user operation (e.g., a user finger tap) on an application through which the information item is rendered. The information items have different formats of data that are to be rendered by different applications at the mobile terminal. For example, a web page is an ASCII-based text document and an audio stream is a binary file. The web page is rendered by a web browser module and the audio stream is processed by an audio player module. Regardless of their respective data formats and associated applications, the mobile terminal can collect these information items, e.g., through the messaging client module. For a web page, the mobile terminal may collect its URL and/or the content of the web page. In the latter case, the messaging client module may edit the content of the web page and make it easier to be stored in the messaging server 40.

As described above, the mobile terminal has limited capacity for storing only a limited number of information items. For large information items, e.g., a 90-minute HD movie, it is also less efficient if the same movie is stored at different mobile terminals. In order to increase the availability of a collected information item to different users, the mobile terminal synchronizes (402) itself with the remote messaging server by uploading the collected information items into the server so that the same or different user can access the plurality of information items stored at the remote server from another terminal. In some implementations, one user may use multiple client devices for collecting information items and viewing them. For example, the user may use a smartphone at work for information collection and a tablet at home. After the user collects an information item using his/her smartphone and uploads the collected information item into the server, the server can then push the collected information item to the tablet (which may be located in an active Wi-Fi environment) immediately or according to a user-specified schedule. By doing so, the same user can access the collected information items through different client devices seamlessly. This feature is also used when the same user changes his/her smartphone. After registering the new smartphone with the messaging server, the messaging server can initiate a synchronization process to push the information items collected by the user using his/her old smartphone down to the new device.

Figure 4B:
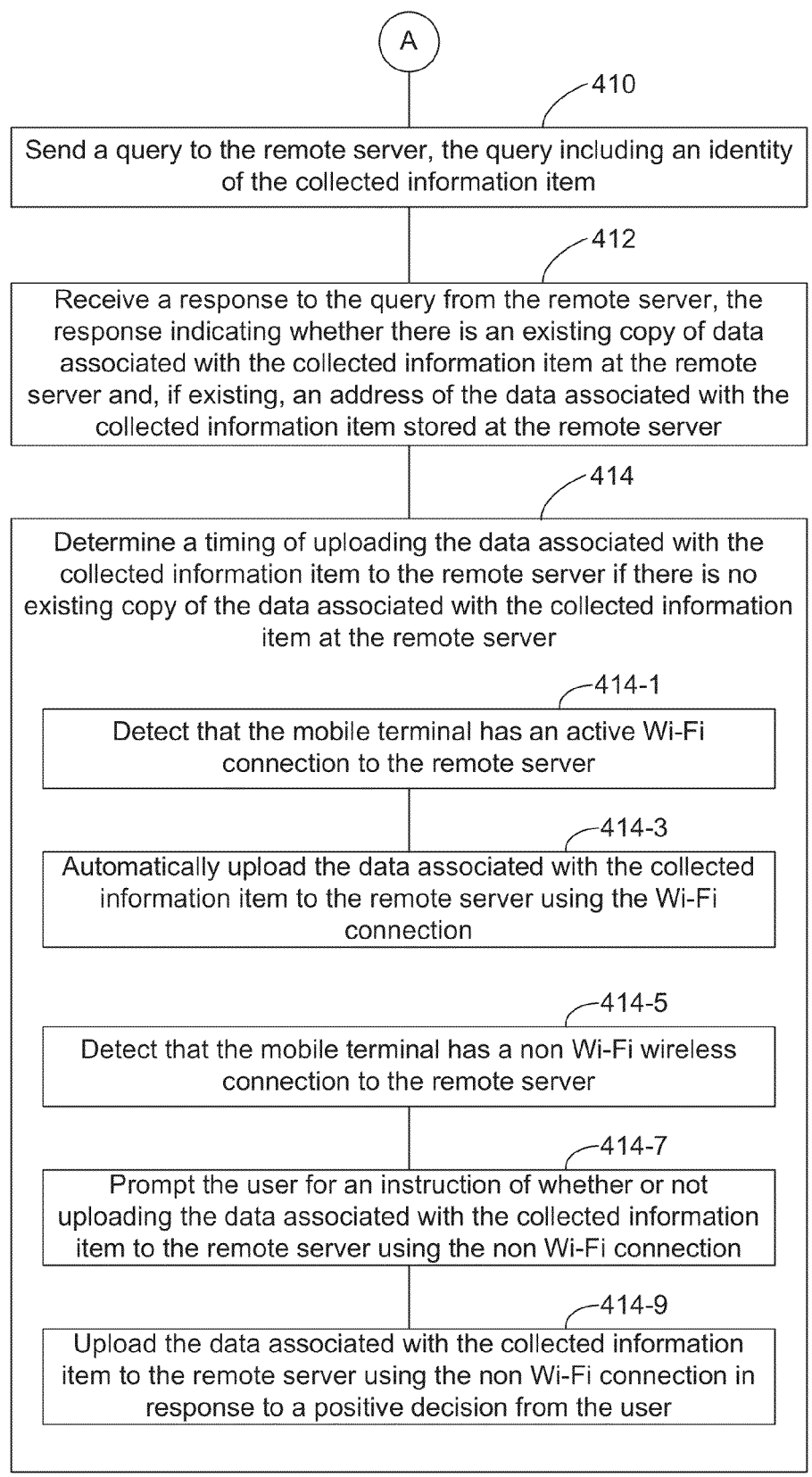

As shown in FIG. 4B, the mobile terminal executes a synchronization strategy using the Wi-Fi connection and minimize the usage of non Wi-Fi connections (e.g., a connection through the cellular wireless network). For each collected information item, the mobile terminal sends (410) a query to the remote messaging server, the query including an identity of the collected information item. In some implementations, the information item's identity is a unique identifier derived from the information item's source and creation timestamp information. The mobile terminal then receives (412) a response to the query from the remote server. As noted above, the stored information item database includes many entries, each entry having a unique identifier. Given an information item identifier, the messaging server 40 (or the data search module 120) can tell whether the corresponding information item has been stored in the database 103 or not. In other words, the response from the messaging server indicates whether there is an existing copy of data associated with the collected information item at the remote server and, if existing, an address of the data associated with the collected information item (e.g., a unique digital fingerprint derived from the content of the information item such that two information items sharing the same digital fingerprint should have identical content and the messaging server only need to save one copy of the information item) stored at the remote server. If there is no existing copy of the data associated with the collected information item at the remote server, the mobile terminal then determines (414) a timing of uploading the data associated with the collected information item to the remote server.

As noted above, one factor that the mobile terminal is configured to consider when determining the timing of the upload is the type of connection (wired or wireless) the mobile terminal has with the remote messaging server 40. For example, if the mobile terminal detects (414-1) that the mobile terminal has an active Wi-Fi connection to the remote server, it then automatically uploads (414-3) the data associated with the collected information item to the remote server using the Wi-Fi connection because most Wi-Fi connection providers do not charge their users based on the amount of data uploaded/downloaded to/from the Internet. While uploading the data associated with the collected information item to the remote server using the Wi-Fi connection, the mobile terminal records information such as the exact amount of data that has been uploaded and a point in the information item that marks the remainder of the data that has not been uploaded yet. Upon detecting that the mobile terminal no longer has an active Wi-Fi connection to the remote messaging server, the mobile terminal can suspend the upload of the data associated with the collected information item to the remote server and save, in its memory, the recorded information regarding the suspension at the mobile terminal so that the mobile terminal can resume the upload in the future using the saved information. In some implementations, the mobile terminal checks the size of the remaining portion of the data associated with the collected information item. If the size is smaller than a predefined threshold (e.g., 50 KB), the mobile terminal may try to upload the remaining portion of the data using a non Wi-Fi connection. But if the size is above the predefined threshold, the mobile terminal may stop the upload temporarily until it reacquires an active Wi-Fi connection to the remote server. The resumption of the upload may occur automatically without user instructions after the mobile terminal has an active Wi-Fi connection to the remote server.

Alternatively, if the mobile terminal detects (414-5) that the mobile terminal has a non Wi-Fi wireless connection to the remote server, e.g., a 3G/4G wireless connection through a carrier's network, the mobile terminal is configured to prompt (414-7) the user for an instruction of whether or not uploading the data associated with the collected information item to the remote server using the non Wi-Fi connection. If the user wants to avoid incurring additional cost for using the non Wi-Fi connection, s/he can choose not to upload the data by responding negatively and wait until, e.g., a Wi-Fi connection or a wired connection becomes available. But in response to a positive decision from the user, the mobile terminal starts (414-9) uploading the data associated with the collected information item to the remote server using the non Wi-Fi connection. While uploading the data associated with the collected information item to the remote server using the non Wi-Fi connection, the mobile terminal also records information such as the exact amount of data that has been uploaded and a point in the information item that marks the remainder of the data that has not been uploaded yet. Upon detecting that the mobile terminal has an active Wi-Fi connection to the remote server, the mobile terminal can then suspend the upload of the data associated with the collected information item to the remote server using the non Wi-Fi connection and resume the upload of the data associated with the collected information item to the remote server using the Wi-Fi connection. Using the saved information, the mobile terminal can resume the upload from a position at which the upload using non Wi-Fi connection is suspended.

Figure 6B:
FIGS. 6A-6O are exemplary screenshots of how a mobile terminal interacts with the messaging server in accordance with some implementations.
Figure 6A:

Referring back to FIG. 4A, after or in parallel to the synchronization step 402, the mobile terminal displays (404) at least a subset of the plurality of information items in a chronological order on its display. FIG. 6A depicts an exemplary screenshot of a list of information items collected by a user using the messaging client module 342 in FIG. 3. In this example, the information items are listed in a reverse chronological order such that the most recent item appears at the top of the list. Note that the information items are of different types and have different data formats and it is within the scope of the present application that the information items may be displayed in a different order, e.g., based on a user-configurable preference or grouped into different categories according to the user's setting instructions. For example, the first one is a text message 601 received by the user from a friend; the second one is a music video 603 in the user's song album; the third one is a news article 605 published on New York Times or the URL of the news article at the website; and the fourth one is a voicemail 607 in the form of audio stream from somebody.

Although the list view provides a user a lot of information about different types of information items collected by the user over time, the user is also given filter options to screen out those collected information items that the user is not currently interested in. As shown in FIG. 6A, one way of filtering out some of the information items from the list view is to enter one or more search keywords into the search box 609. Alternatively, as shown in FIG. 6B, the user can also sort the collected information items by their types information by tapping the filter icon 611.

Figure 4C:
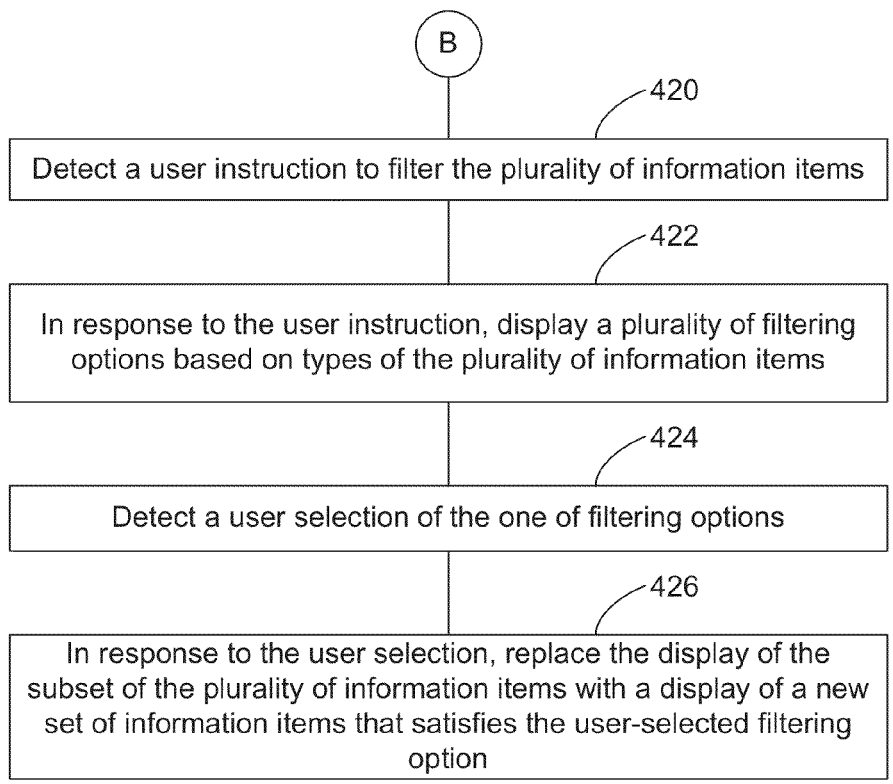
Figure 6D:
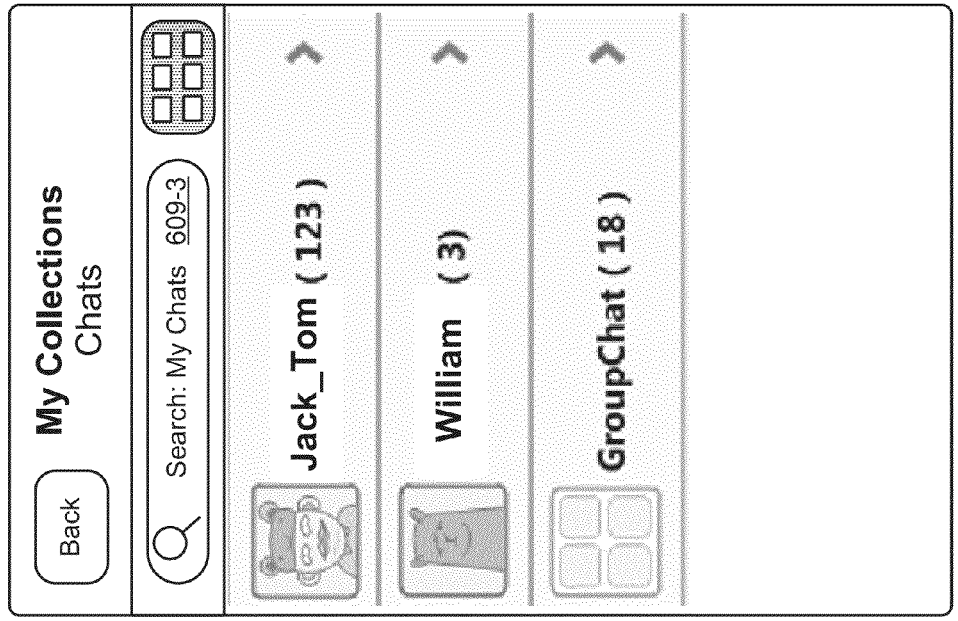
Figure 6C:
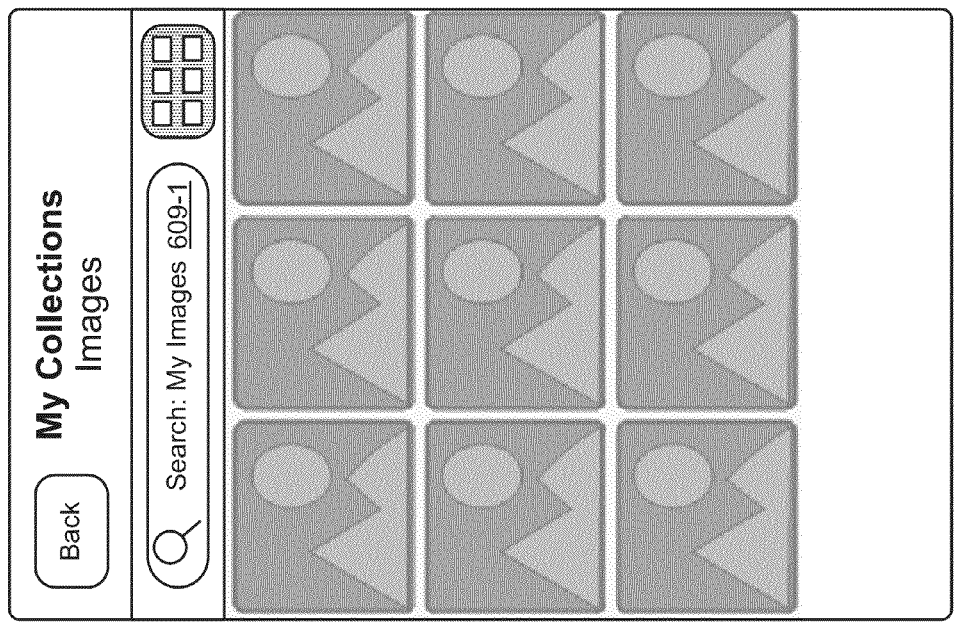

As shown in FIG. 4C, in response to detecting (420) the user instruction to filter the plurality of information items, the mobile terminal displays (422) a plurality of filtering options based on types of the plurality of information items. As noted above, when a user taps on an information item for collection, the mobile terminal stores not only the information item itself (e.g., content and address) but also metadata associated with the information item, such as the author, type, source of the information item, the publication and collection timestamp of the information item, the subject, synopsis, and comments (made by the author or the collector) of the information item, etc. In some implementations, an information item collected from a particular source may be tagged with additional labels. For example, a text message may have a tag indicating which conversation it belongs to and a set of participants of this conversation. Both the content and metadata of an information item may be indexed by the mobile terminal and the messaging server for search-related operations. For example, a user can specify a time window for identifying information items collected by the user during that time window. Similarly, the user can limit the search to a specific type of collected information items, e.g., messages published at a particular group chat room. FIG. 6B depicts six different filtering options 613-1 to 613-11 for the user to choose from. Then in response to detecting (424) a user selection of the one of filtering options, the mobile terminal then replaces (426) the display of the subset of the plurality of information items (e.g., the list view in FIG. 6A) with a display of a new set of information items that satisfies the user-selected filtering option. FIG. 6C depicts a 2D grid view of thumbnail images when the user taps the images filtering option 613-5. FIG. 6D depicts a list view of chat sessions between the user and his/her friends that have been collected. Note that after the user selects one of the filtering options, the search box (609-1 in FIG. 6C or 609-3 in FIG. 6D) is updated so that the search scope is limited to those information items that have satisfied the user-selected filtering options. Note that the actual images associated with the thumbnail images may have been processed by the messaging server 40 (or more specifically, the data processing module 130) to, e.g., extract text from them for search purposes.

Referring back to FIG. 4A again, after displaying the information items, the mobile terminal may detect (406) a user selection of one of the displayed information items. In some implementations, the mobile terminal does not necessarily have the data associated with every information item displayed on its screen. For example, when the user chooses to collect a video stream from the Internet, the mobile terminal may display an entry corresponding to the video stream without downloading the video stream yet. Therefore, in response to the user selection, the mobile terminal determines (408) whether data associated with the user-selected information item is in the mobile terminal or not. If the data associated with the user-selected information item is in the mobile terminal, the mobile terminal then renders (410) the data on the mobile terminal by, e.g., invoking appropriate applications to process the data. If the data associated with the user-selected information item is not currently in the mobile terminal, the mobile terminal then downloads (412) the data from the remote server and then renders the data on the mobile terminal accordingly.

Figure 6F:
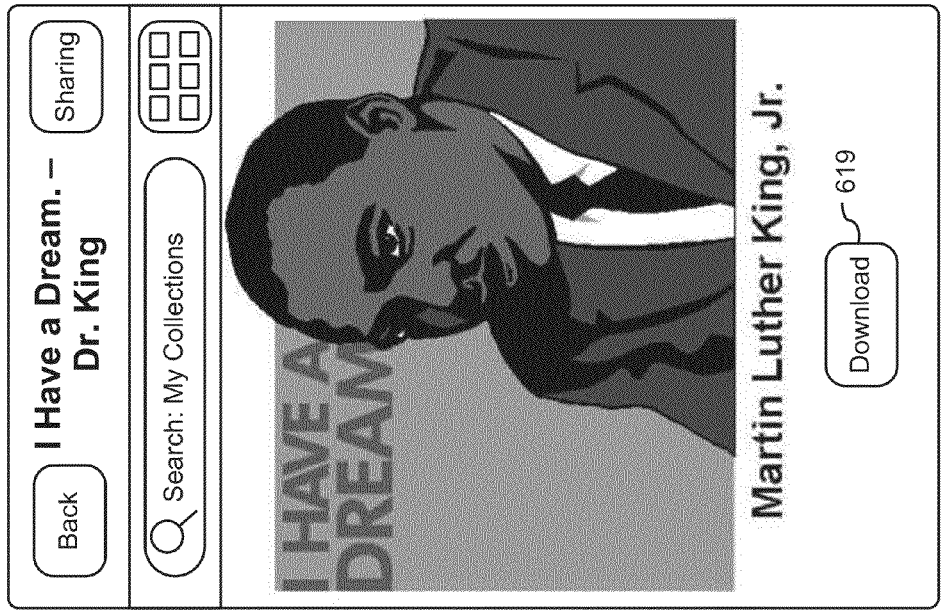
Figure 6E:
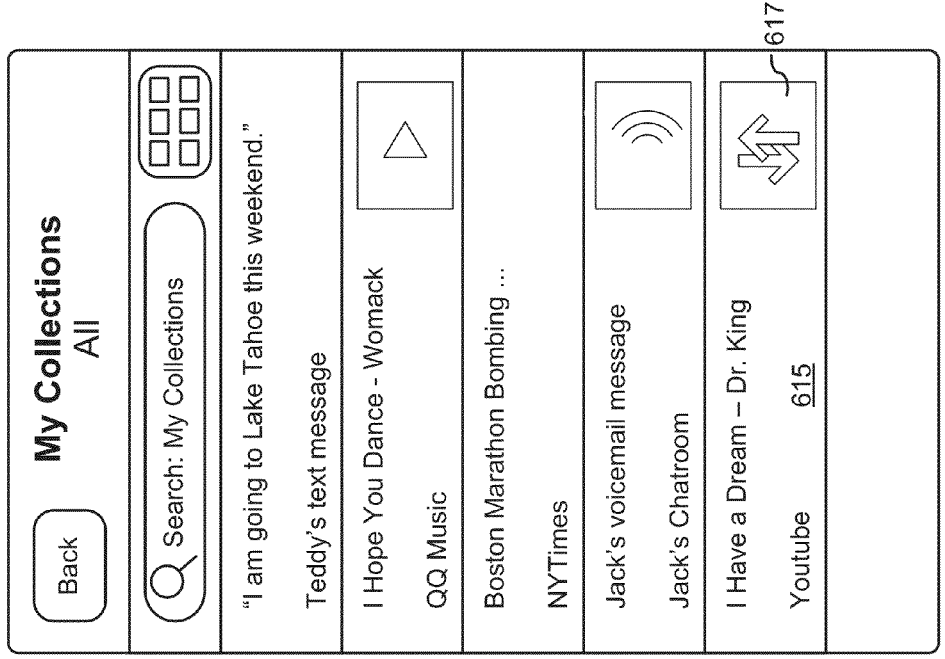

FIG. 6E depicts that the list view includes a video stream 615 of Dr. King's speech "I have a dream." A special symbol 617 is displayed next to the title of the information item, indicating that the mobile terminal has not synchronized itself with the remote server for this information item. Note that there are two possibilities associated with the special symbol 617: (i) the mobile terminal has the video stream in its memory but has not uploaded the video stream into the remote server; and (ii) the mobile terminal does not have the video stream in its memory (but may have some information about the information item, e.g., its title, source, type, etc.) while the remote server may have it.

As shown in FIG. 6F, in response to a user selection of the information item 615, the mobile terminal invokes an application to play the video stream. In this example, it is assumed that the mobile terminal does not have the data associated with the video stream but the remote server has the video stream. Therefore, a download icon 619 is displayed at the bottom of the screen. In response to the user selection of the download icon 619, the mobile terminal sends a request to the remote server for downloading the video stream, the request including information for identifying the video stream. In response to the request, the remote server queries its database for the video stream. In case that the video stream is not found in the database, the remote server may use the identifying information to determine where to download the video stream. Very often, the same video stream may be collected by multiple users such that the remote server already has the requested video stream and push it down to the requesting mobile terminal.

Figure 6H:
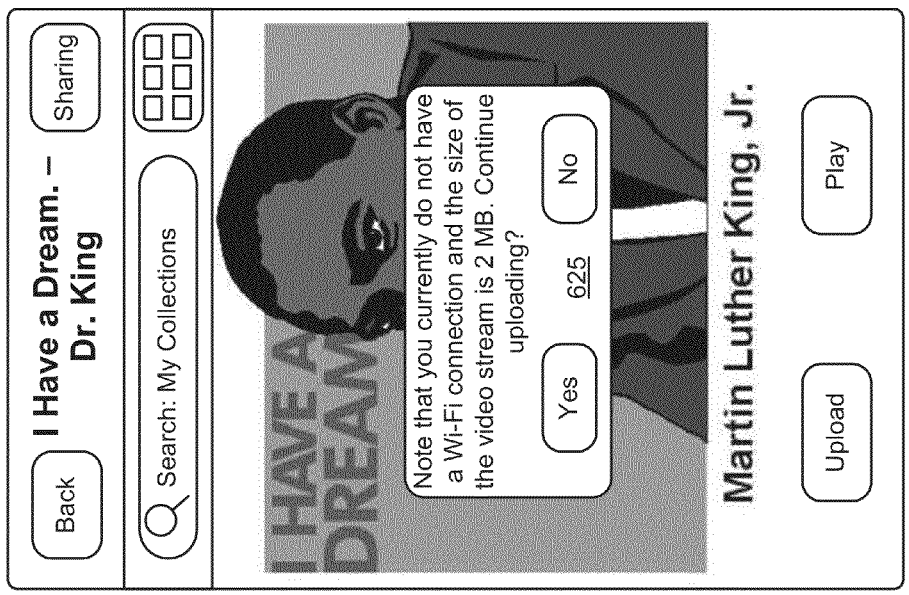
Figure 6G:
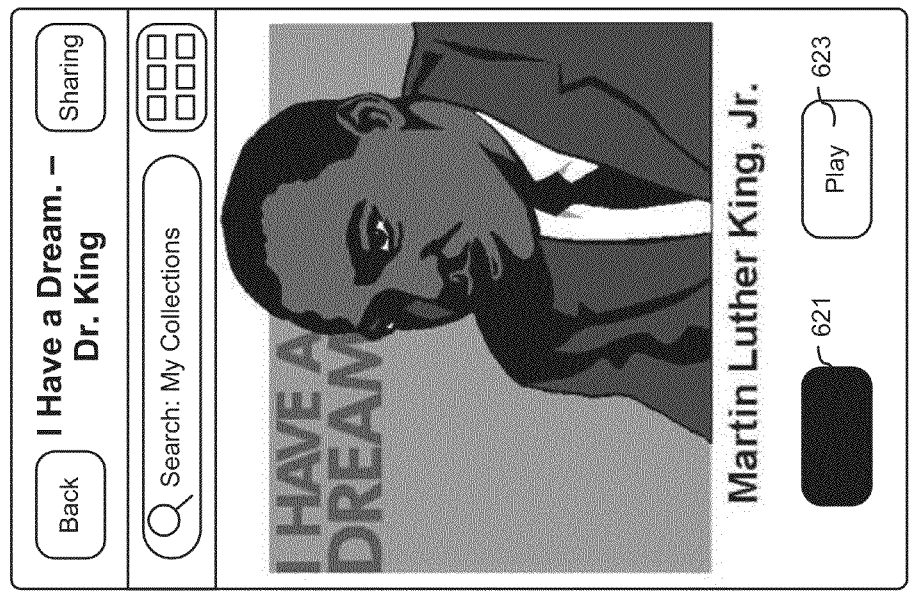

FIG. 6G depicts the other possibility where the mobile terminal has the video stream but needs to synchronize itself with the remote server. In this case, the mobile terminal displays an upload icon 621 and a play icon 623. In response to a user selection of the play icon 623, the mobile terminal can start playing the video stream. Note that the mobile terminal may invoke a video player module within the messaging client module 342. Alternatively, the mobile terminal may temporarily put the messaging client module 342 in the backend and then activate the video player module for playing the video stream. Assuming that the mobile terminal has no active Wi-Fi connection, the mobile terminal will not automatically synchronize itself with the remote server. In response to the user selection of the upload icon 621, the mobile terminal generates a pop-up window 625 as shown in FIG. 6H, prompting the user to determine whether or not to use the non Wi-Fi connection (if there is one) for uploading the video stream given the relative large size of the video stream. In some implementations, the mobile terminal first submits a request to the remote server before uploading the video stream, the request including an identifier of the video stream to be uploaded. Upon receipt of the request, the remote server searches its stored information item database to determine whether there is already a copy of the video stream in the database. If so, the remote server returns a response to the mobile terminal, the response including an address of the video stream in the database. Based on the response, the mobile terminal then provides an update on its display, indicating that the video stream has already been "uploaded" into the remote server. This feature can potentially reduce the cost of uploading information items because the mobile terminal is actually sharing the same information item previously uploaded from another client device. Moreover, this feature also makes it more efficient for the remote server to push the information item to another client device used by the same user. Since the data usage of submitting the request and receiving the response is relatively small, the mobile terminal always submits the request regardless of whether it has an active Wi-Fi connection or not. Only if there is no existing copy of the information item at the remote server and the size of the information item to be uploaded exceeds the predefined threshold, may the mobile terminal displays the prompt message as shown in FIG. 6H.

Figure 4D:
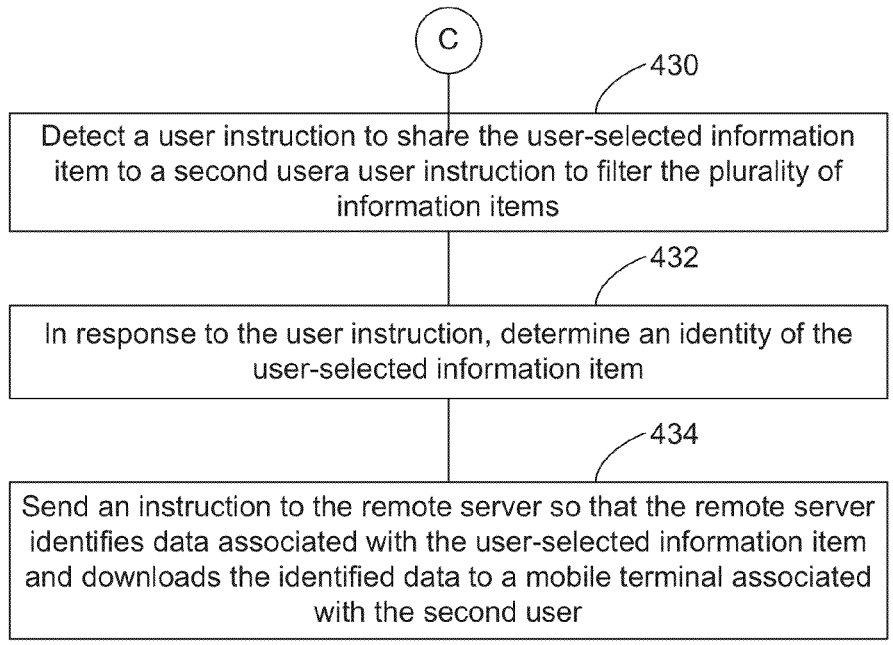

A user can not only collect information items for his/her own use but also share them with others through, e.g., different social networking service applications. As shown in FIG. 4D, upon detecting (430) a user instruction to share the user-selected information item to a second user, the mobile terminal determines (432) an identity of the user-selected information item (in this case, the video stream of Dr King's speech) and then sends (434) an instruction to the remote server for sharing the video stream. FIG. 6I depicts an exemplary screenshot that includes a sharing icon 627 for the user to select. In response to a user selection of the sharing icon, the mobile terminal generates two icons 629 and 631. The user can choose the recipient(s) of the information item by selecting the icon 629 and provide additional information (e.g., a comment) to the recipient. In some implementations, the instruction sent to the messaging server includes the identity of the user-selected information item and an identity of the second user. Using such information, the remote server identifies data associated with the user-selected information item and pushes the identified data to a mobile terminal associated with the second user.

Figure 6J:
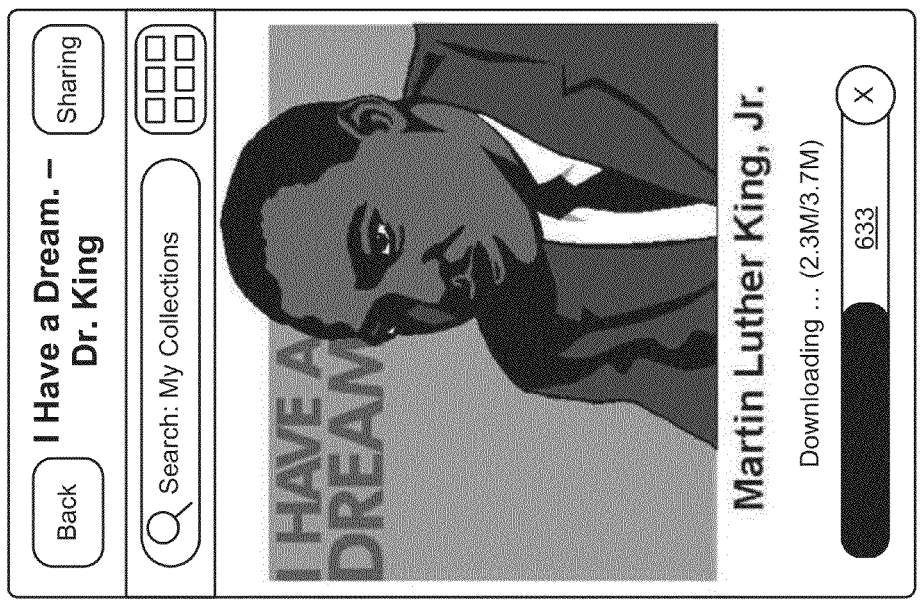
Figure 6I:
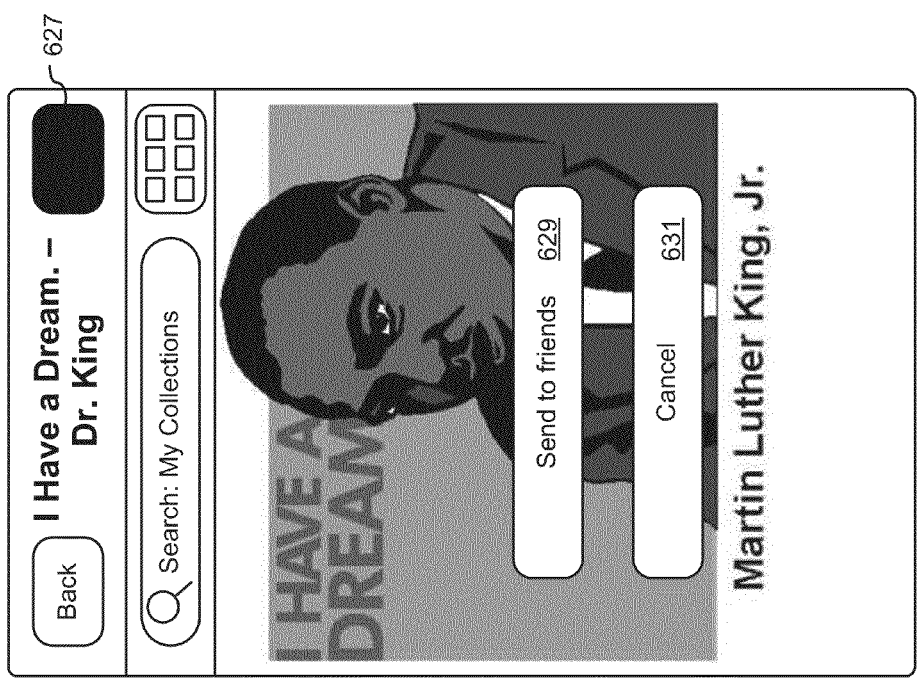
Figure 6L:
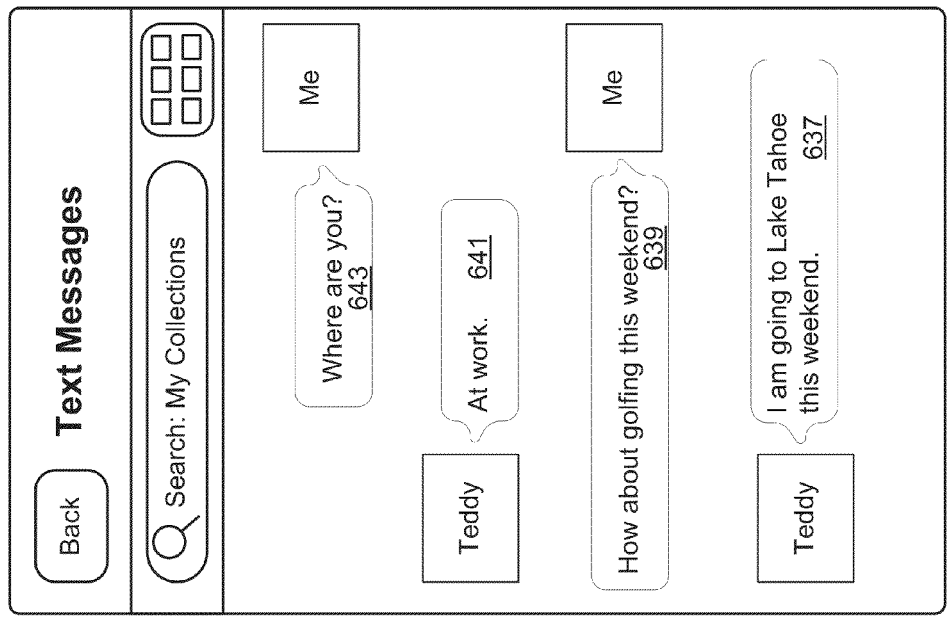
Figure 6K:
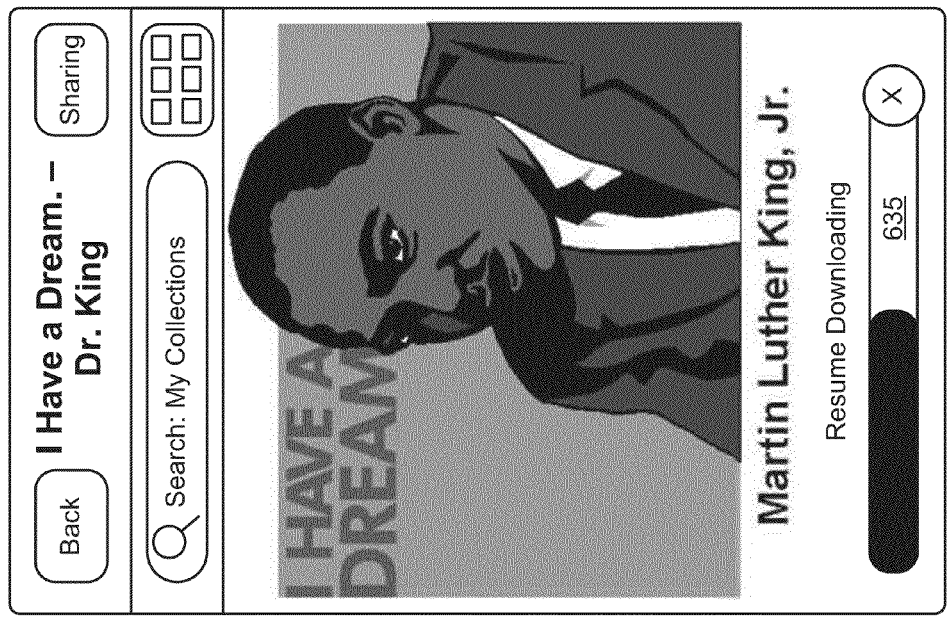

FIGS. 6J and 6K further illustrate different synchronization states. In particular, FIG. 6J illustrates that the mobile terminal is downloading the video stream from the remote server using, e.g., an active Wi-Fi connection, and a corresponding progress bar 633. FIG. 6K illustrates that, after a suspension of the downloading (e.g., due to the interruption to the Wi-Fi connection), the mobile terminal resumes the download of the video stream and a corresponding progress bar 635.

In some implementations, there is contextual or background information associated with a collected information item. When a user revisits the collected information item, the mobile terminal can bring back the contextual or background information so as to put the collected information item into an appropriate context. This feature is very useful if the collected information item is a short text message. In response to the user selection, the mobile terminal identifies one or more messages immediately before and/or after the user-selected information item and displays them together with the user-selected text message. FIG. 6L depicts an exemplary screenshot after a user selection of the text message 601 in FIG. 6A. There are three messages 639, 641, 643 immediately before the text message 637, which provides more contextual information about the user-collected text message 601. In this example, the text message 637 is the last one of the conversation. But one skilled in the art would understand that there might be messages immediately after the message 637 if it is not the last one of the conversation. In some implementations, when a user shares a collected information item with another user, the contextual information is provided to the other user as well. The user is also allowed to edit the contextual information if necessary. For example, when a user shares a text message with others, s/he may choose to delete some other text messages from the context or annotate the shared text message by providing additional background information or explanation to make it easier to be understood by others. As noted above, both the collected information item and the contextual/background information may be indexed for search related operations.

In some implementations, a user can not only collect different types of information items but also collect them using different applications. To support this feature, the messaging client module 342 may provide an open API for third-party applications to invoke its information collection function. FIGS. 5A-5D are flow charts illustrating how a user of a third-party application invokes an electronic messaging client to store information items at the messaging server in accordance with some implementations. Note that the third-party application may be running on the same mobile terminal as the messaging client module 342 or on a different client device (which does not have to be mobile terminal).

Figure 5A:
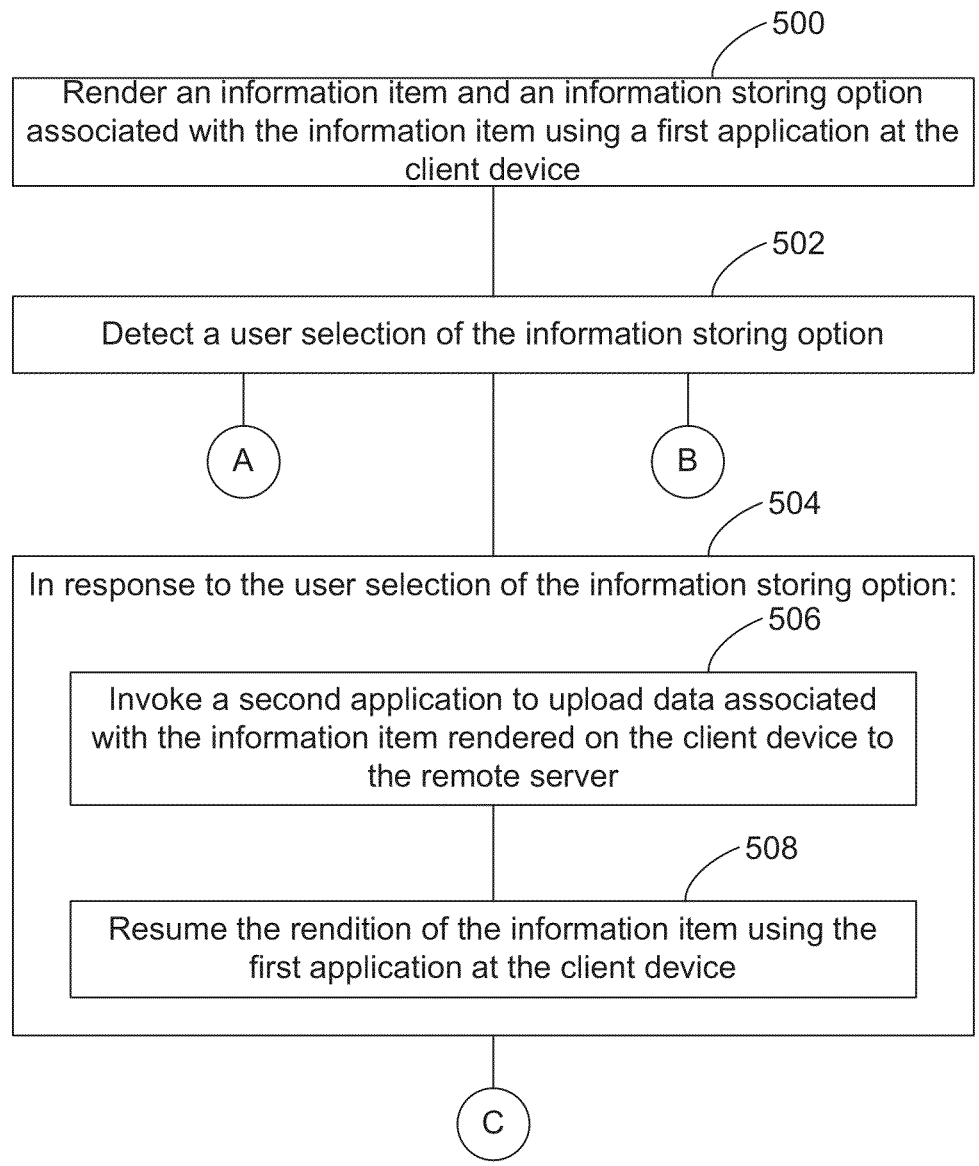
FIGS. 5A-5D are flow charts illustrating how a user of a third-party application invokes an electronic messaging client to store information items at the messaging server in accordance with some implementations.

As shown in FIG. 5A, the client device renders (500) an information item and an information storing option associated with the information item using a first application at the client device. For example, the user may be using a web browser on the client device to watch a video stream or a web page and then decide to collect the video stream or the web page and have it stored in the messaging server for future use by selecting the information storing option. The client device detects (502) a user selection of the information storing option. In response to the user selection of the information storing option (504), the client device then invokes (506) a second application to upload data associated with the information item rendered on the client device to the remote server and resumes (508) the rendition of the information item using the first application at the client device.

Figure 5B:
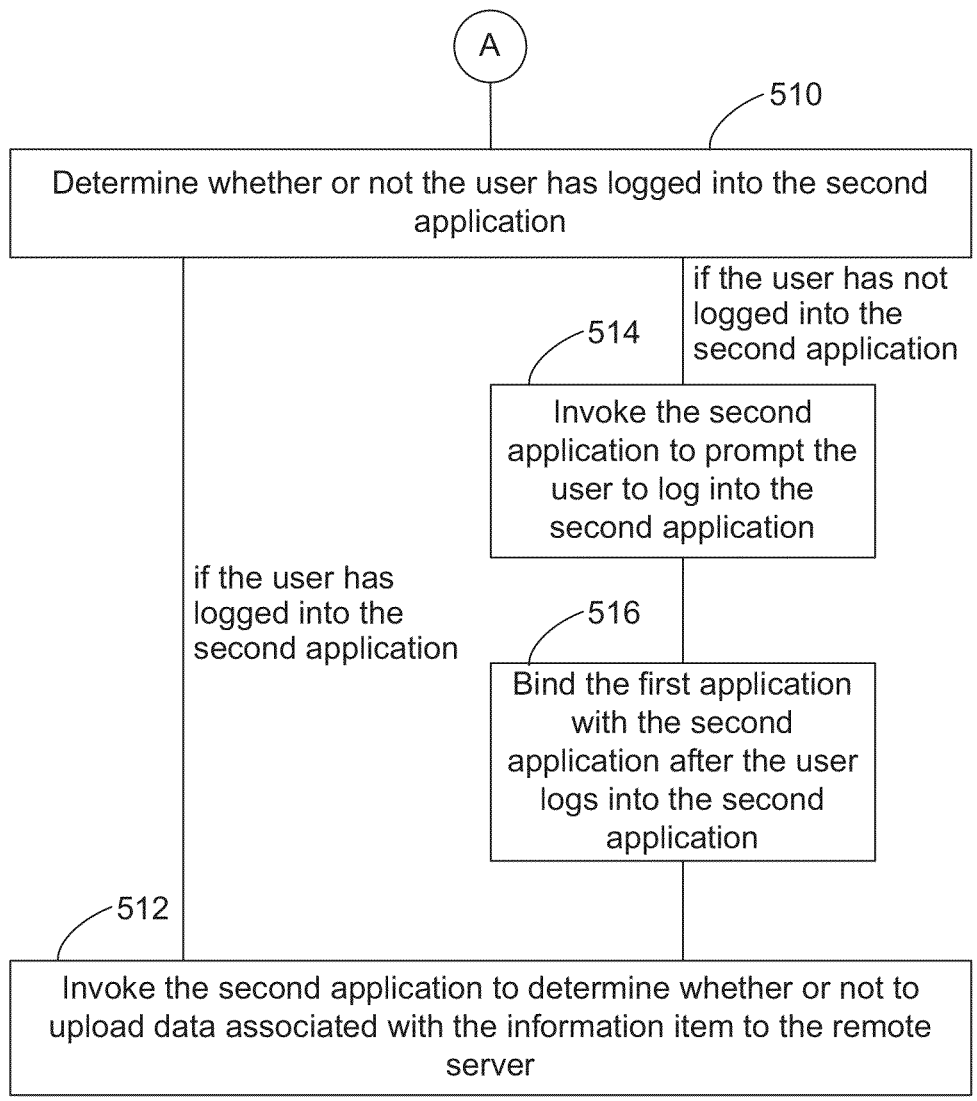

As noted above, the client device supporting the third-party application may or may not be the same as the mobile terminal supporting the messaging client module 342. FIG. 5B depicts an information collection process when the two devices are the same entity, i.e., a mobile terminal. Upon detecting (502) the user selection of the information storing option, the mobile terminal then determines (510) whether or not the user has logged into the second application (e.g., the messaging client module 342). If the user has logged into the second application, the mobile terminal then invokes (512) the second application to determine whether or not to upload data associated with the information item to the remote server. If the user has not logged into the second application, the mobile terminal first invokes (514) the second application to prompt the user to log into the second application and then binds (516) the first application with the second application after the user logs into the second application before invoking the second application. In some implementations, the first application provides an API for the second application (e.g., the messaging client module 342) to authenticate a user before collecting the user-selected information item. In this case, a user tap on the information storing option at the first application prompts the user to provide his/her login information at the messaging server without leaving the first application. In some other implementations, the same user has a separate user account associated with the first application. In response to a user selection of the information storing option, the first application terminal may prompt the user to bind his/her account at the first application with the his/her account at the second application. Either the first application or the second application may set a timer for the binding such that the two user accounts are decoupled from each other after a predefined time period, e.g., ranging from a few hours to a few days. In yet some other implementations, the first application transfers the collected information item to the second application and let the second application handle the user authentication and information collection/synchronization with the messaging server independently. At the end of the process, the second application gives the user an option to return to the first application at which the user selects the information storing icon. In some implementations, the user can also sort the collected information items like the way as described above in connection with FIG. 6B.

Figure 6M:
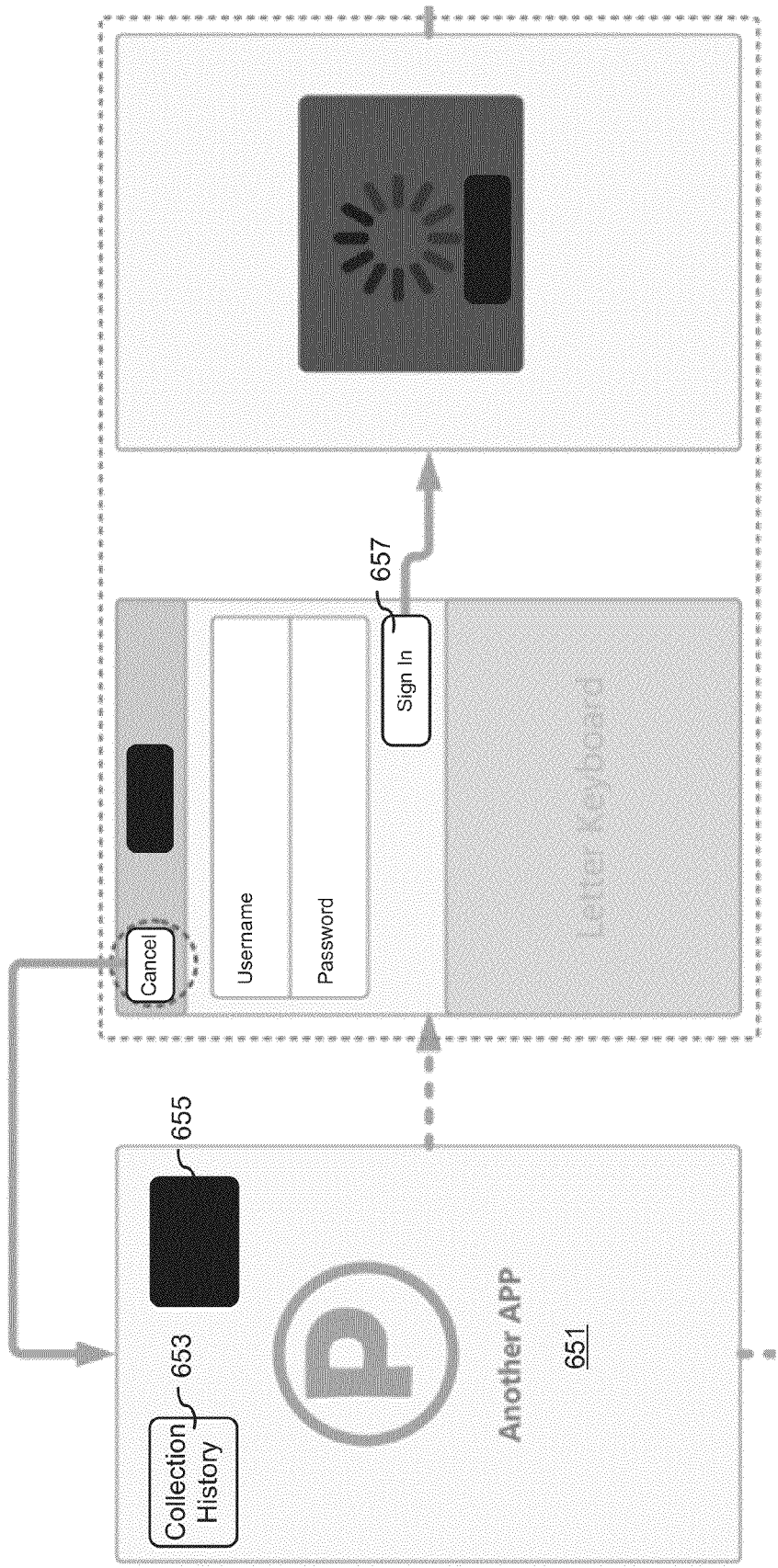
Figure 6N:
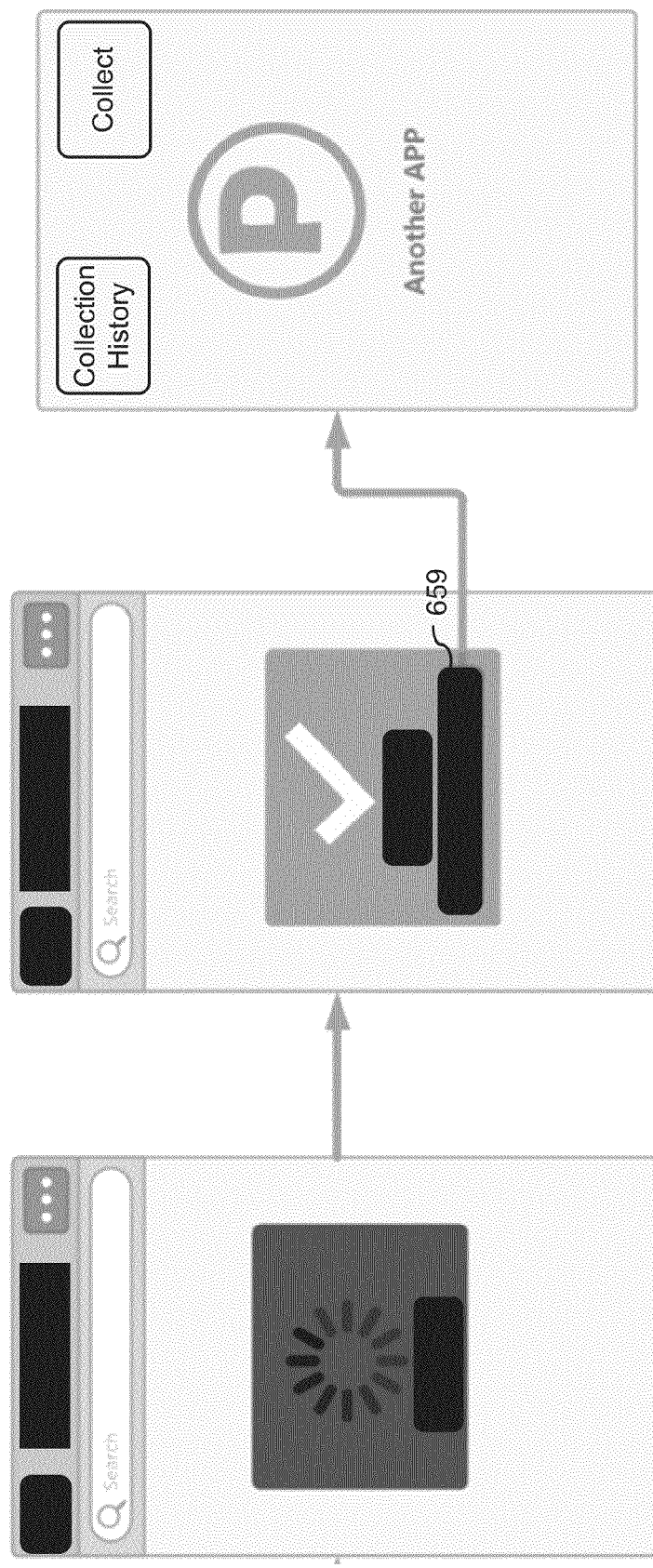

FIGS. 6M and 6N depict multiple screenshots of the process. The process starts with a user selection of the collect icon 655 in the third-party application 651. Assuming that the user has not logged into his or her account at the messaging server, the messaging client module 342 then brings up a login screen for the user to enter username and password. After the user clicks the sign-in icon, the messaging client module 342 then communicates with the messaging server 40 to verify the user's login request and then associates the mobile terminal with the user's account at the messaging server once the user is authenticated. As shown in FIG. 6N, after the user logs into his/her account, the messaging client module 342 then starts storing the information item (e.g., the web page or its URL) shown at the third-party application. After completing the storage of the information item, the messaging client module 342 may provide a return to app icon 659 for the user to return to the third-party application that triggers the process. In response to a user selection of the icon, the mobile terminal brings back the third-party application. In some implementations, the mobile terminal automatically brings back the third-party application after the completion of the information item collection. Note that the messaging client module 342 determines the timing of uploading the collected information item to the messaging server as described above.

Figure 5C:
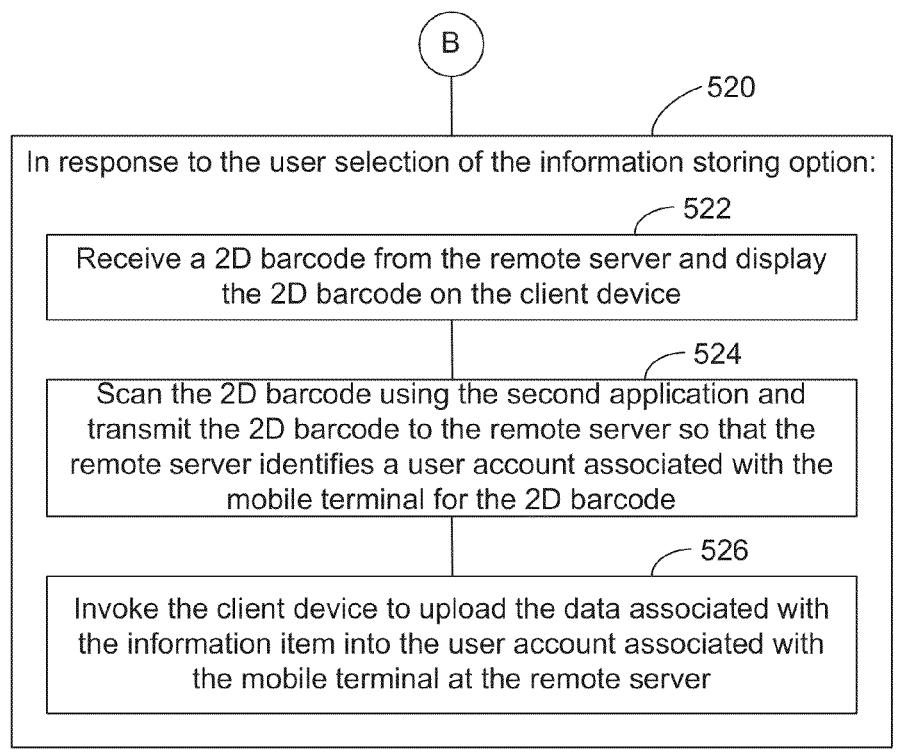

FIG. 5C depicts an information collection process when the two devices are different from each other. For example, the client device is a desktop computer and the mobile terminal is a smartphone. In this case, after the user selection of the information storing option (520), the client device sends an information collection request to the messaging server. But at this moment, since the client device does not necessarily know a user account bound to the smartphone, the remote server returns a unique information identifier, e.g., a 2D barcode to the client device. After receiving the 2D barcode, the client device displays (522) the 2D barcode on its screen. The user of the smartphone, who has logged into his/her account at the messaging server, then uses (524) the messaging client module to scan the 2D barcode and transmit the 2D barcode to the remote server. Along with the 2D barcode, the smartphone also transmits the user's account information at the messaging server. Using the 2D barcode and the user's account information, the remote server identifies a user account associated with the mobile terminal and determines that the information item at the client device should be stored in the messaging server under the identified user account. In some implementations, the messaging server then sends an instruction back to the client device, invoking (526) the client device to upload the data associated with the information item into the user account associated with the mobile terminal at the remote server. In some other implementations, the client device already sends the information item to be saved or its identity to the messaging server when it asks for the 2D barcode. After determining which user account should be associated with the information item, the messaging server can start processing the information item without having to re-invoking the client device. In either case, the messaging server may synchronize itself with the smartphone so that the user of the smartphone can access the collected information item locally.

Figure 5D:
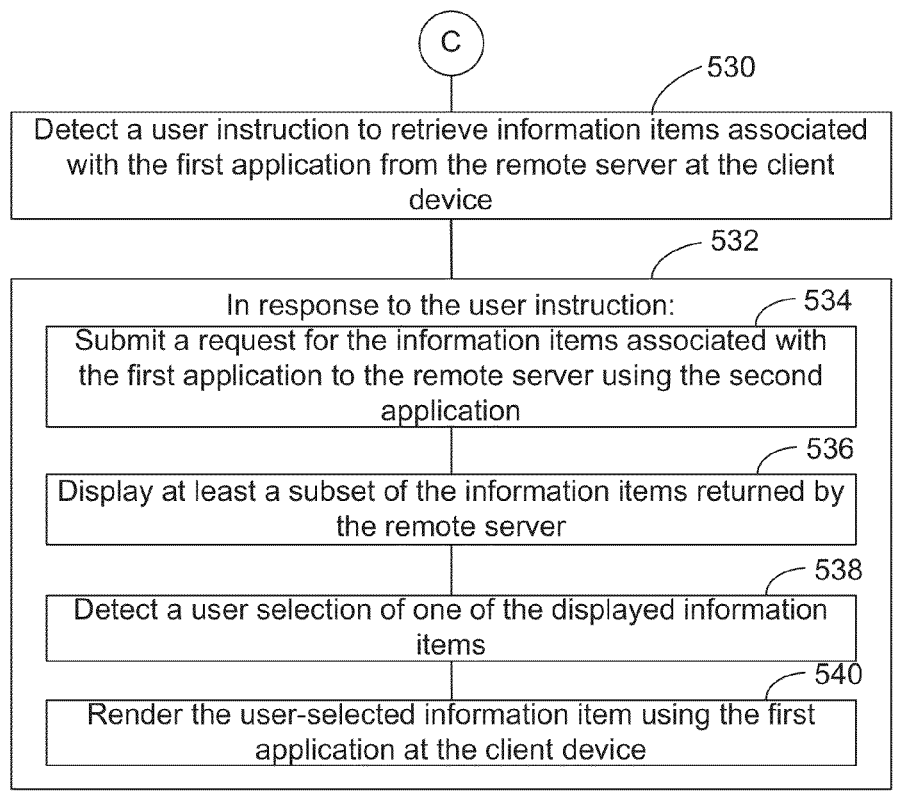
Figure 6O:
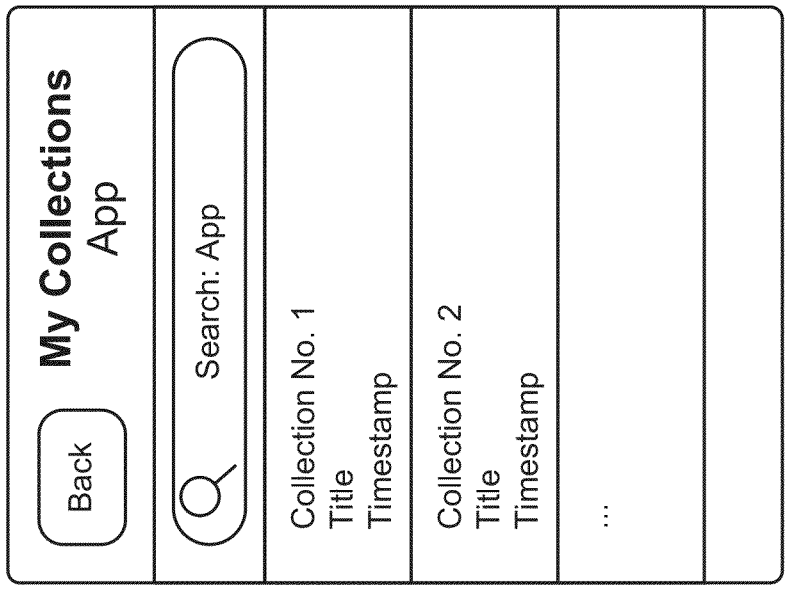
Figure 6O:
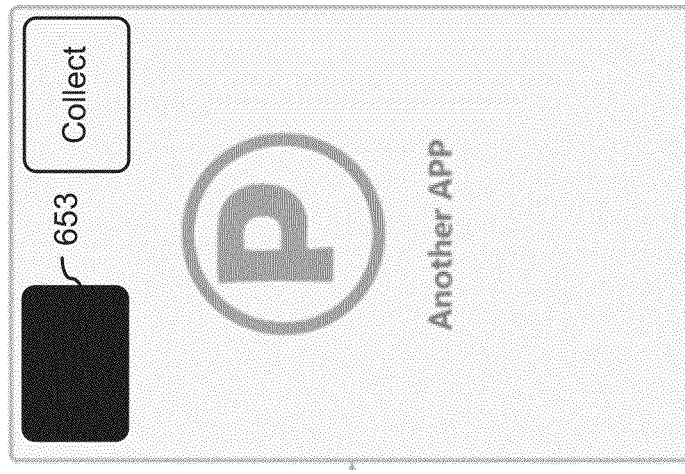

In some implementations, a user of the third-party application can not only upload information items from the third-party application to the messaging server but also pull back the information items that s/he has collected over time from the messaging server. This feature enables a two-way traffic between the messaging server and the third-party application and makes it more attractive for third-party application to support this information storing function. As shown in FIG. 5D, after uploading the data associated with the information item to the remote server, the client device detects (530) a user instruction to retrieve information items associated with the first application from the remote server at the client device. In response to the user instruction (532), the client device submits (534) a request for the information items associated with the first application to the remote server using the second application. As noted above, regardless of whether the client device and the mobile terminal are the same or not, the messaging server can authenticate the request from the client device and determine which user account should be tied with the request and return the collected information items associated with the first application accordingly. The client device then displays (536) at least a subset of the information items returned by the remote server. Note that the information items returned by the remote server may be displayed through the first application or the second application on the client device or the mobile terminal. Assuming that the information items are displayed on the client device, in response to detecting (538) a user selection of one of the displayed information items, the client device then renders (540) the user-selected information item using the first application accordingly. FIG. 6O depicts a similar process performed at a mobile terminal. In response to a user selection of the collection history icon 653 in the third-party application, the mobile terminal receives all the information items associated with the third-party application over time and generates a list view of the collected information items. A user can then activate any of them using the third-party application.

Reference has been made in detail to implementations, examples of which are illustrated in the accompanying drawings. While particular implementations are described, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for managing information items at a mobile terminal, wherein the mobile terminal has memory and one or more processors and is communicatively coupled to a remote server, the method comprising:
   collecting a plurality of information items identified by a user of the mobile terminal using a social network application, wherein the plurality of information items are of different types and have different data formats that are to be rendered by different applications at the mobile terminal, each having creation timestamp information defined by the social networking application;
   synchronizing the mobile terminal with the remote server so that the user can access the plurality of information items stored at the remote server from another terminal;
   organizing the plurality of information items into a list in a chronological order based on their respective creation timestamp information;
   displaying at least a subset of the list in a single window;
   in response to detecting a user selection of one of the displayed information items in the single window, determining whether data associated with the user-selected information item is in the mobile terminal or not;
   when the data associated with the user-selected information item is in the mobile terminal, rendering the data on the mobile terminal by invoking the application associated with the type and data format of the user selected information item in the single window; and
   when the data associated with the user-selected information item is not currently in the mobile terminal, downloading the data from the remote server and then rendering the data on the mobile terminal by invoking the application associated with the type and data format of the user selected information item in the single window.

2. The method of claim 1, wherein the plurality of information items include one selected from the group consisting of an image, a web page, a URL, a text message, a text document, an audio stream, a video stream, and a geographical location.

3. The method of claim 1, wherein an information item is collected from a respective source in response to a predefined user operation on an application associated with the source through which the information item is rendered.

4. The method of claim 1, wherein synchronizing the mobile terminal with the remote server further includes: for a collected information item:
   sending a query to the remote server, the query including an identity of the collected information item;
   receiving a response to the query from the remote server, the response indicating whether there is an existing copy of data associated with the collected information item at the remote server and, if existing, an address of the data associated with the collected information item stored at the remote server; and
   determining a timing of uploading the data associated with the collected information item to the remote server if there is no existing copy of the data associated with the collected information item at the remote server.

5. The method of claim 4, wherein determining a timing of uploading the data associated with the collected information item to the remote server further includes:
   detecting that the mobile terminal has an active Wi-Fi connection to the remote server; and
   automatically uploading the data associated with the collected information item to the remote server using the Wi-Fi connection.

6. The method of claim 5, further comprising:
   while uploading the data associated with the collected information item to the remote server using the Wi-Fi connection:
   detecting that the mobile terminal no longer has an active Wi-Fi connection to the remote server;
   suspending the upload of the data associated with the collected information item to the remote server; and
   saving information regarding the suspension at the mobile terminal so that the mobile terminal can resume the upload in the future using the saved information.

7. The method of claim 6, wherein the upload of the data associated with the collected information item is suspended if a size of a remaining portion of the data associated with the collected information item exceeds a predefined threshold.

8. The method of claim 4, wherein determining a timing of uploading the data associated with the collected information item to the remote server further includes:
   detecting that the mobile terminal has a non Wi-Fi wireless connection to the remote server;
   prompting the user for an instruction of whether or not uploading the data associated with the collected information item to the remote server using the non Wi-Fi connection; and
   uploading the data associated with the collected information item to the remote server using the non Wi-Fi connection in response to a positive decision from the user.

9. The method of claim 8, further comprising:
   while uploading the data associated with the collected information item to the remote server using the non Wi-Fi connection:
   detecting that the mobile terminal has an active Wi-Fi connection to the remote server;
   suspending the upload of the data associated with the collected information item to the remote server using the non Wi-Fi connection; and
   resuming the upload of the data associated with the collected information item to the remote server using the Wi-Fi connection, wherein the upload is resumed from a position at which the upload using non Wi-Fi connection is suspended.

10. The method of claim 1, further comprising:
    detecting a user instruction to share the user-selected information item to a second user;
    determining an identity of the user-selected information item; and sending an instruction to the remote server, the instruction including the identity of the user-selected information item and an identity of the second user so that the remote server can identify data associated with the user-selected information item and download the identified data to a mobile terminal associated with the second user.

11. The method of claim 10, wherein the data associated with the user-selected information item includes at least one of author information, publication and collection timestamps of the information item, and type, subject, synopsis, and comment information of the information item.

12. The method of claim 1, further comprising:
after displaying at least a subset of the list:
detecting a user instruction to filter the plurality of information items;
in response to the user instruction, displaying a plurality of filtering options based on types of the plurality of information items, each option corresponding to a specific filter type;
detecting a user selection of the one of filtering options; and
in response to the user selection:
filtering the plurality of information items to identify a new set of information items whose associated type and data format satisfy the filter type of the user-selected filtering option; and
replacing the display of the at least a subset of the plurality of information items with a display of the new set of information items.

13. The method of claim 1, wherein the user-selected information item is associated with an electronic messaging application and rendering the data on the mobile terminal further includes:
identifying one or more messages immediately before and/or after the user-selected information item; and
displaying the identified messages and the user-selected information item on the mobile terminal.

14. A mobile terminal, comprising:
one or more processors; and
memory for storing programs, wherein the programs, when executed by the one or more processors, cause the mobile terminal to perform the following operations:
collecting a plurality of information items identified by a user of the mobile terminal using a social network application, wherein the plurality of information items are of different types and have different data formats that are to be rendered by different applications at the mobile terminal, each having creation timestamp information defined by the social networking application;
synchronizing the mobile terminal with the remote server so that the user can access the plurality of information items stored at the remote server from another terminal;
organizing the plurality of information items into a list in a chronological order based on their respective creation timestamp information;
displaying at least a subset of the list in a single window;
in response to detecting a user selection of one of the displayed information items in the single window, determining whether data associated with the user-selected information item is in the mobile terminal or not;
when the data associated with the user-selected information item is in the mobile terminal, rendering the data on the mobile terminal by invoking the application associated with the type and data format of the user selected information item in the single window; and
when the data associated with the user-selected information item is not currently in the mobile terminal, downloading the data from the remote server and then rendering the data on the mobile terminal by invoking the application associated with the type and data format of the user selected information item in the single window.

15. The mobile terminal of claim 14, wherein the plurality of information items include one selected from the group consisting of an image, a web page, a URL, a text message, a text document, an audio stream, a video stream, and a geographical location.

16. The mobile terminal of claim 14, wherein the one or more programs further include instructions for:
detecting a user instruction to share the user-selected information item to a second user;
in response to the user instruction:
determining an identity of the user-selected information item; and
sending an instruction to the remote server, the instruction including the identity of the user-selected information item and an identity of the second user so that the remote server can identify data associated with the user-selected information item and download the identified data to a mobile terminal associated with the second user.

* * * * *